(12) United States Patent
Rollinger et al.

(10) Patent No.: US 8,265,859 B2
(45) Date of Patent: Sep. 11, 2012

(54) METHOD AND SYSTEM FOR PRE-IGNITION CONTROL

(75) Inventors: John Eric Rollinger, Sterling Heights, MI (US); Robert Roy Jentz, Westland, MI (US); Robert Sarow Baskins, Grass Lake, MI (US); Chris Paul Glugla, Macomb, MI (US); Karen Willard, Grosse Pointe Farms, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 13/309,409

(22) Filed: Dec. 1, 2011

(65) Prior Publication Data

US 2012/0073542 A1 Mar. 29, 2012

Related U.S. Application Data

(63) Continuation of application No. 12/851,428, filed on Aug. 5, 2010, now Pat. No. 8,073,613.

(51) Int. Cl.
*F02D 41/14* (2006.01)

(52) U.S. Cl. ........ 701/111; 701/103; 123/435; 123/436; 123/690

(58) Field of Classification Search .................. 701/103, 701/111; 123/435, 436, 690
See application file for complete search history.

(56) References Cited

U.S. PATENT DOCUMENTS

| | | | |
|---|---|---|---|
| 4,282,841 A | 8/1981 | Takagi et al. | |
| 4,366,701 A | 1/1983 | Bittner | |
| 4,489,692 A | 12/1984 | Haraguchi et al. | |
| 5,632,247 A | 5/1997 | Hashizume et al. | |
| 5,905,193 A | 5/1999 | Hashizume et al. | |
| 6,044,824 A | 4/2000 | Mamiya et al. | |
| 6,062,189 A | 5/2000 | Kaneko et al. | |
| 6,446,601 B1 | 9/2002 | Franke et al. | |
| 6,505,603 B1 | 1/2003 | Schray et al. | |
| 7,275,519 B2 | 10/2007 | Miyazaki et al. | |
| 7,302,932 B2 | 12/2007 | Shelby et al. | |
| 2009/0276147 A1* | 11/2009 | Hamama et al. | 701/111 |
| 2009/0292446 A1 | 11/2009 | Tanaka | |
| 2011/0083640 A1 | 4/2011 | Garagnani et al. | |
| 2011/0139118 A1* | 6/2011 | Glugla et al. | 123/406.29 |

OTHER PUBLICATIONS

Glugla, Chris Paul et al., "Method and System for Pre-Ignition Control," U.S. Appl. No. 12/851,384, filed Aug. 5, 2010, 63 pages.
Rollinger, John Eric et al., "Method and System for Pre-Ignition Control," U.S. Appl. No. 12/851,459, filed Aug. 5, 2010, 66 pages.

* cited by examiner

*Primary Examiner* — Erick Solis
(74) *Attorney, Agent, or Firm* — Julia Voutyras; Alleman Hall McCoy Russell & Tuttle LLP

(57) ABSTRACT

Methods and systems are provided for mitigating engine pre-ignition based on a feed-forward likelihood of pre-ignition and feedback from a pre-ignition event. In response to an indication of pre-ignition, a cylinder may be enriched while an engine load is limited. The enrichment may be followed by an enleanment to restore exhaust catalyst feed-gas oxygen levels. The mitigating steps may be adjusted based on engine operating conditions, a pre-ignition count, as well as the nature of the pre-ignition.

16 Claims, 8 Drawing Sheets

METHOD AND SYSTEM FOR PRE-IGNITION CONTROL

CROSS REFERENCE TO RELATED APPLICATIONS

The present application is a continuation of U.S. patent application Ser. No. 12/851,428 filed Aug. 5, 2010, the entire contents of which are incorporated herein by reference for all purposes.

FIELD

The present description relates generally to methods and systems for controlling a vehicle engine in response to pre-ignition detection.

BACKGROUND/SUMMARY

Under certain operating conditions, engines that have high compression ratios, or are boosted to increase specific output, may be prone to low speed pre-ignition combustion events. The early combustion due to pre-ignition can cause very high in-cylinder pressures, and can result in combustion pressure waves similar to combustion knock, but with larger intensity. Strategies have been developed for prediction and/or early detection of pre-ignition based on engine operating conditions. Additionally, following detection, various pre-ignition mitigating steps may be taken.

The inventors herein have recognized that not all cylinder pre-ignition events are the same, and that pre-ignition mitigation steps may need to be adjusted based on the nature of the pre-ignition event, as well as the pre-ignition history of the cylinder. For example, mitigating steps used for a cylinder with sporadic pre-ignition may not be as effective for a cylinder with recurrent pre-ignition. In other words, a more aggressive approach to pre-ignition mitigation may be required during some pre-ignition events as compared to other pre-ignition events.

Thus, in one example, the issue may be addressed by a method of operating an engine comprising, in response to intermittent pre-ignition in a cylinder, enriching the cylinder, and limiting engine load by a first amount, and in response to persistent pre-ignition in the cylinder, enriching the cylinder, and limiting engine load by a second amount, greater than the first amount.

In one example, in response to an indication of cylinder pre-ignition, an engine controller may update a cylinder pre-ignition history. The indication of pre-ignition may be based on engine operating conditions such as knock intensity (as determined by a knock sensor), a crankshaft acceleration (as determined by a crankshaft sensor), spark plus ionization, and/or based on changes in cylinder pressure as a result of abnormal cylinder combustion events. The cylinder pre-ignition history may include, for example, a cylinder pre-ignition count, including a number of cylinder pre-ignition events that have occurred over the lifetime of the cylinder's operation, as well as a number of cylinder pre-ignition events that have occurred over the current engine cycle. The history may further include a number of consecutive pre-ignition events in the cylinder. In one example, in response to a plurality of discrete pre-ignition events over a plurality of consecutive cylinder combustion events (that is, a number of consecutive cylinder pre-ignition events being less than a threshold), an engine controller may determine intermittent pre-ignition in the cylinder, and may adjust the mitigating steps accordingly. In another example, in response to a plurality of continuous pre-ignition events over the plurality of consecutive cylinder combustion events (that is, a number of consecutive cylinder pre-ignition events exceeding the threshold), the engine controller may determine persistent pre-ignition in the cylinder, and may adjust the mitigating steps accordingly.

For example, in response to the indication of intermittent pre-ignition in the cylinder, the controller may immediately enrich the cylinder and limit the engine load by a first amount, while in response to the indication of persistent pre-ignition in the cylinder, the controller may immediately enrich the cylinder by a second, larger amount. In both cases, enriching the cylinder may include operating the cylinder at an air-to-fuel ratio richer than stoichiometry for a given duration. By enriching the cylinder in response to an occurrence of pre-ignition, an immediate cylinder air charge cooling effect may be achieved that may reduce the occurrence of further abnormal combustion events. The simultaneous limiting of engine load, for example by reducing air flow, can further assist in reducing the occurrence of additional pre-ignition events. However, the effect of load limiting on pre-ignition may be delayed until a stable air flow is reached.

The enrichment in response to the intermittent pre-ignition may differ from the enrichment in response to the persistent pre-ignition. For example, the enrichment in response to the intermittent pre-ignition may be less rich and/or for a shorter duration while the enrichment is response to the persistent pre-ignition may be more rich and/or for a longer duration. The engine load limiting may be similarly adjusted. As such, limiting an engine load may include reducing the air flow by adjusting one or more of a throttle opening, engine boost, cam timing, valve timing, waste-gate timing, etc. Thus, in one example, in response to the intermittent pre-ignition, throttle opening and boost may be reduced by a smaller amount, while in response to the persistent pre-ignition, throttle opening and boost may be reduced by a larger amount. In another example, the camshaft timing may be adjusted by a larger amount in response to persistent pre-ignition and by a smaller amount in response to intermittent pre-ignition.

In one example, the load limiting may be synchronized with the enrichment by performing the load limiting at a ramp-in rate that is coordinated with the enrichment operation. For example, the ramp-in rate may be adjusted such that ramping in of the limited load is completed concurrent to completion of the enrichment.

In another example, an engine may include a first and second group of cylinders. Herein, in response to intermittent pre-ignition in a cylinder in the first group of cylinders, the controller may enrich the given cylinder and limit an engine load of all cylinders in the first group, and not the second group, for example by adjusting a cam timing of first group but not the second group. In comparison, in response to persistent pre-ignition in a cylinder in the first group, the controller may enrich the given cylinder and limit an engine load of all cylinders in the first and second group. In one example, this may include limiting an engine load of all cylinders in the first and second group by the same (larger) amount. In another example, this may include limiting an engine load of all cylinders in the first group by a larger amount while limiting an engine load of all cylinders in the second group by a smaller amount.

Similarly, the enrichment profile for other cylinders of the different groups may be adjusted differently based on the nature of the pre-ignition. For example, in response to persistent pre-ignition in a cylinder in the first group, the given cylinder may be enriched more rich and/or for a longer duration, while other cylinders in the first group are also enriched, but for a shorter duration and/or less rich. In another example, cylinders in the second group may also be enriched in response to the persistent pre-ignition to reduce the likelihood of further engine pre-ignition events. In comparison, in response to intermittent pre-ignition in a cylinder in the first group, only the given cylinder may be enriched. Still other combinations may be possible.

Further still, in addition to the enrichment and load limiting, cylinder spark timing may be advanced by an amount. Specifically, spark may be advanced, relative to the spark timing at the time of pre-ignition detection, towards MBT. The amount of spark advance may be adjusted based on the current engine speed, the enrichment, and/or the nature of the pre-ignition. Thus, as the degree of richness and/or duration of enrichment increases, the amount of spark advance may be increased. Further, a higher amount of spark advance may be used in response to persistent pre-ignition while a smaller amount of spark advance may be used in response to intermittent pre-ignition. Since the cylinder may be more tolerant to spark advance due to the richer than stoichiometry air-to-fuel ratio during the enrichment, spark advance may be advantageously used in conjunction with the enrichment to maintain IMEP under the rich conditions of the cylinder.

The updated pre-ignition history (including the updated pre-ignition count) may also be used to determine a likelihood of pre-ignition in a cylinder. For example, at the onset of engine operation, a controller may determine a feed-forward likelihood of pre-ignition based on the engine's operating conditions and further based on the pre-ignition history of the engine's cylinders, and accordingly may preemptively limit an engine load based on the likelihood of pre-ignition. The above described pre-ignition mitigating steps (enrichment and further load limiting) may then be applied in response to the indication of pre-ignition, and the nature of the pre-ignition.

In this way, by adjusting pre-ignition mitigating steps based on the nature of the pre-ignition, pre-ignition related issues may be better addressed, and further occurrences of pre-ignition may be reduced. Specifically, by responding more aggressively to persistent pre-ignition and less aggressively to intermittent pre-ignition, engine pre-ignition may be better addressed.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 1:
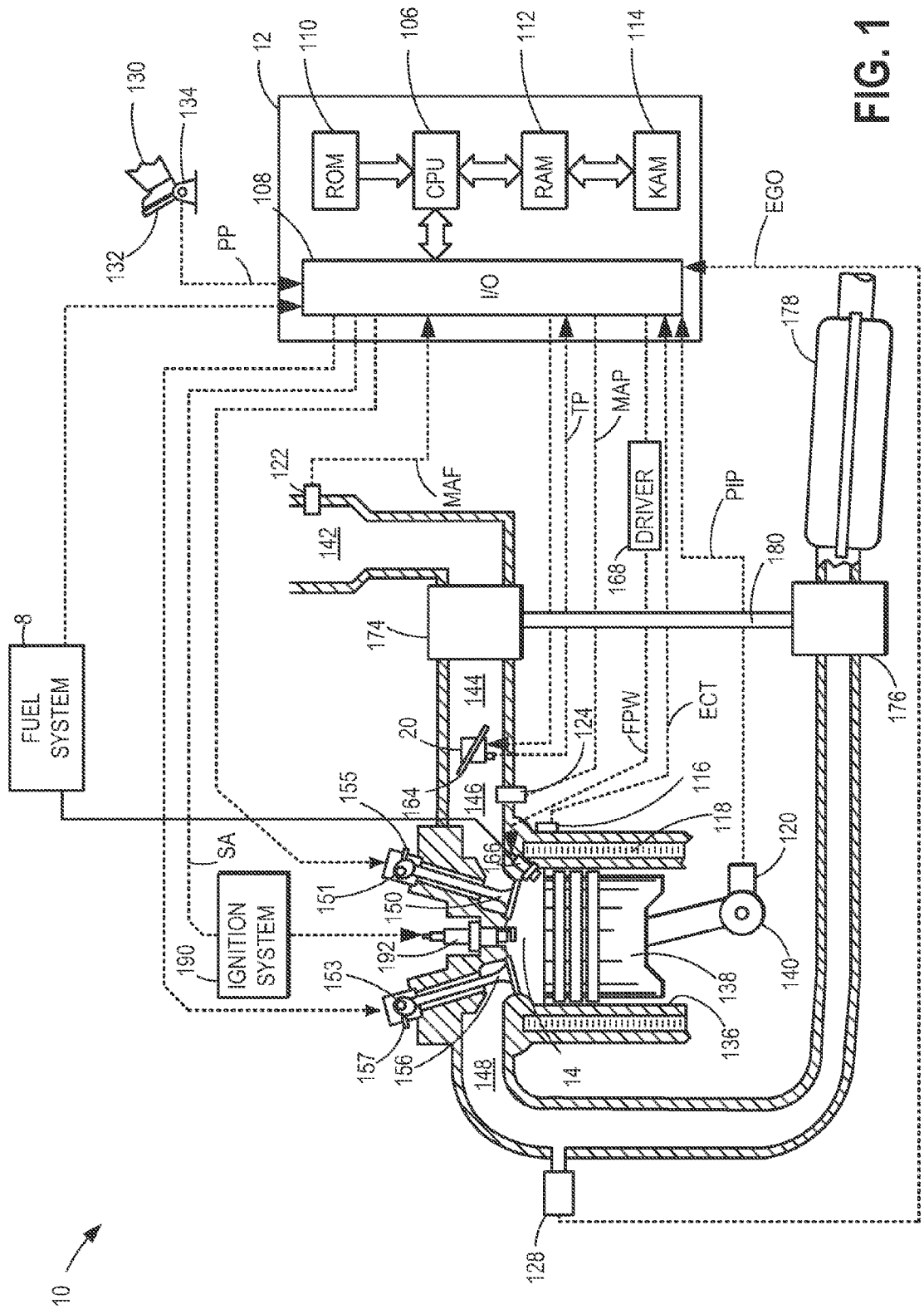
FIG. 1 shows an example combustion chamber.

The following description relates to systems and methods for reducing the risk of abnormal combustion events related to pre-ignition such as in the engine system of FIG. 1. As elaborated herein with reference to FIGS. 2-5, an engine controller may first determine a likelihood of pre-ignition based on engine operating conditions, and limit an engine load based on the determined likelihood. Then, in response to an indication of pre-ignition, the controller may update a pre-ignition history (including a pre-ignition count), and may further limit the engine load. The controller may further adjust a fuel injection to one or more engine cylinders to address pre-ignition without degrading exhaust emissions. For example, the controller may be configured to perform a control routine, such as the routine of FIG. 6, to enrich the cylinders for a first duration, to cool the cylinder air-charge and reduce the risk of further abnormal cylinder combustion events. The enrichment and load limiting may be adjusted based on the engine operating conditions, the nature of the pre-ignition, a pre-ignition count, etc. For example, the controller may perform a routine, such as the routine of FIG. 7, to increase the richness and duration of the enrichment, and to increase an amount of load limiting, as a pre-ignition count increases, and/or as the pre-ignition becomes more frequent. Following the enrichment, the cylinders may be transitioned to a lean fuel injection profile for a second duration. The enleanment may be adjusted based on the preceding enrichment so as to return the exhaust oxygen levels within a range wherein exhaust catalyst efficiency is not degraded. Following the pre-ignition mitigating fuel injection operation, the controller may resume stoichiometric fuel injection. Example fuel injection operations are illustrated herein with reference to FIGS. 8-9. The controller may store details of the pre-ignition event in the database to improve anticipation of future pre-ignition events.

FIG. 1 depicts an example embodiment of a combustion chamber or cylinder of internal combustion engine 10. Engine 10 may receive control parameters from a control system including controller 12 and input from a vehicle operator 130 via an input device 132. In this example, input device 132 includes an accelerator pedal and a pedal position sensor 134 for generating a proportional pedal position signal PP. Cylinder (herein also "combustion chamber") 14 of engine 10 may include combustion chamber walls 136 with piston 138 positioned therein. Piston 138 may be coupled to crankshaft 140 so that reciprocating motion of the piston is translated into rotational motion of the crankshaft. Crankshaft 140 may be coupled to at least one drive wheel of the passenger vehicle via a transmission system. Further, a starter motor may be coupled to crankshaft 140 via a flywheel to enable a starting operation of engine 10.

Cylinder 14 can receive intake air via a series of intake air passages 142, 144, and 146. Intake air passage 146 can communicate with other cylinders of engine 10 in addition to cylinder 14. In some embodiments, one or more of the intake passages may include a boosting device such as a turbocharger or a supercharger. For example, FIG. 1 shows engine 10 configured with a turbocharger including a compressor 174 arranged between intake passages 142 and 144, and an exhaust turbine 176 arranged along exhaust passage 148. Compressor 174 may be at least partially powered by exhaust turbine 176 via a shaft 180 where the boosting device is configured as a turbocharger. However, in other examples, such as where engine 10 is provided with a supercharger, exhaust turbine 176 may be optionally omitted, where compressor 174 may be powered by mechanical input from a motor or the engine. A throttle 20 including a throttle plate 164 may be provided along an intake passage of the engine for varying the flow rate and/or pressure of intake air provided to the engine cylinders. For example, throttle 20 may be disposed downstream of compressor 174 as shown in FIG. 1, or alternatively may be provided upstream of compressor 174.

Exhaust passage 148 can receive exhaust gases from other cylinders of engine 10 in addition to cylinder 14. Exhaust gas sensor 128 is shown coupled to exhaust passage 148 upstream of emission control device 178. Sensor 128 may be selected from among various suitable sensors for providing an indication of exhaust gas air/fuel ratio such as a linear oxygen sensor or UEGO (universal or wide-range exhaust gas oxygen), a two-state oxygen sensor or EGO (as depicted), a HEGO (heated EGO), a NOx, HC, or CO sensor, for example. Emission control device 178 may be a three way catalyst (TWC), NOx trap, various other emission control devices, or combinations thereof.

Exhaust temperature may be estimated by one or more temperature sensors (not shown) located in exhaust passage 148. Alternatively, exhaust temperature may be inferred based on engine operating conditions such as speed, load, air-fuel ratio (AFR), spark retard, etc. Further, exhaust temperature may be computed by one or more exhaust gas sensors 128. It may be appreciated that the exhaust gas temperature may alternatively be estimated by any combination of temperature estimation methods listed herein.

Each cylinder of engine 10 may include one or more intake valves and one or more exhaust valves. For example, cylinder 14 is shown including at least one intake poppet valve 150 and at least one exhaust poppet valve 156 located at an upper region of cylinder 14. In some embodiments, each cylinder of engine 10, including cylinder 14, may include at least two intake poppet valves and at least two exhaust poppet valves located at an upper region of the cylinder.

Intake valve 150 may be controlled by controller 12 by cam actuation via cam actuation system 151. Similarly, exhaust valve 156 may be controlled by controller 12 via cam actuation system 153. Cam actuation systems 151 and 153 may each include one or more cams and may utilize one or more of cam profile switching (CPS), variable cam timing (VCT), variable valve timing (VVT) and/or variable valve lift (VVL) systems that may be operated by controller 12 to vary valve operation. The position of intake valve 150 and exhaust valve 156 may be determined by valve position sensors 155 and 157, respectively. In alternative embodiments, the intake and/or exhaust valve may be controlled by electric valve actuation. For example, cylinder 14 may alternatively include an intake valve controlled via electric valve actuation and an exhaust valve controlled via cam actuation including CPS and/or VCT systems. In still other embodiments, the intake and exhaust valves may be controlled by a common valve actuator or actuation system, or a variable valve timing actuator or actuation system.

Cylinder 14 can have a compression ratio, which is the ratio of volumes when piston 138 is at bottom center to top center. Conventionally, the compression ratio is in the range of 9:1 to 10:1. However, in some examples where different fuels are used, the compression ratio may be increased. This may happen, for example, when higher octane fuels or fuels with higher latent enthalpy of vaporization are used. The compression ratio may also be increased if direct injection is used due to its effect on engine knock. In some embodiments, each cylinder of engine 10 may include a spark plug 192 for initiating combustion. Ignition system 190 can provide an ignition spark to combustion chamber 14 via spark plug 192 in response to spark advance signal SA from controller 12, under select operating modes. However, in some embodiments, spark plug 192 may be omitted, such as where engine 10 may initiate combustion by auto-ignition or by injection of fuel as may be the case with some diesel engines.

In some embodiments, each cylinder of engine 10 may be configured with one or more fuel injectors for providing fuel thereto. As a non-limiting example, cylinder 14 is shown including one fuel injector 166. Fuel injector 166 is shown coupled directly to cylinder 14 for injecting fuel directly therein in proportion to the pulse width of signal FPW received from controller 12 via electronic driver 168. In this manner, fuel injector 166 provides what is known as direct injection (hereafter also referred to as "DI") of fuel into combustion cylinder 14. While FIG. 1 shows injector 166 as a side injector, it may also be located overhead of the piston, such as near the position of spark plug 192. Such a position may improve mixing and combustion when operating the engine with an alcohol-based fuel due to the lower volatility of some alcohol-based fuels. Alternatively, the injector may be located overhead and near the intake valve to improve mixing. Fuel may be delivered to fuel injector 166 from a high pressure fuel system 8 including fuel tanks, fuel pumps, and a fuel rail. Alternatively, fuel may be delivered by a single stage fuel pump at lower pressure, in which case the timing of the direct fuel injection may be more limited during the compression stroke than if a high pressure fuel system is used. Further, while not shown, the fuel tanks may have a pressure transducer providing a signal to controller 12. It will be appreciated that, in an alternate embodiment, injector 166 may be a port injector providing fuel into the intake port upstream of cylinder 14.

It will also be appreciated that while the depicted embodiment illustrates the engine being operated by injecting fuel via a single direct injector; in alternate embodiments, the engine may be operated by using two injectors (for example, a direct injector and a port injector) and varying a relative amount of injection from each injector.

Fuel may be delivered by the injector to the cylinder during a single cycle of the cylinder. Further, the distribution and/or relative amount of fuel delivered from the injector may vary with operating conditions. Furthermore, for a single combustion event, multiple injections of the delivered fuel may be performed per cycle. The multiple injections may be performed during the compression stroke, intake stroke, or any appropriate combination thereof. Also, as elaborated in FIG. 6, fuel may be injected during the cycle to adjust the air-to-injected fuel ratio (AFR) of the combustion. For example, fuel may be injected to provide a stoichiometric AFR. An AFR sensor may be included to provide an estimate of the in-cylinder AFR. In one example, the AFR sensor may be an exhaust gas sensor, such as EGO sensor 128. By measuring an amount of residual oxygen (for lean mixtures) or unburned hydrocarbons (for rich mixtures) in the exhaust gas, the sensor may determine the AFR. As such, the AFR may be provided as a Lambda ($\lambda$) value, that is, as a ratio of actual AFR to stoichiometry for a given mixture. Thus, a Lambda of 1.0 indicates a stoichiometric mixture, richer than stoichiometry mixtures may have a lambda value less than 1.0, and leaner than stoichiometry mixtures may have a lambda value greater than 1.

As described above, FIG. 1 shows only one cylinder of a multi-cylinder engine. As such each cylinder may similarly include its own set of intake/exhaust valves, fuel injector(s), spark plug, etc.

Fuel tanks in fuel system 8 may hold fuel with different fuel qualities, such as different fuel compositions. These differences may include different alcohol content, different octane, different heat of vaporizations, different fuel blends, and/or combinations thereof etc.

As elaborated with reference to FIGS. 2-7, based on engine operating conditions, and cylinder pre-ignition history, an engine controller may determine a likelihood of pre-ignition, and may adjust an engine load preemptively. In response to a subsequent occurrence of pre-ignition in a cylinder, the controller may further limit the engine load and adjust a fuel injection in the cylinder for a defined number of subsequent combustion events, to enrich the cylinder and mitigate the pre-ignition. In one example, the detection of pre-ignition may involve sensing abnormal combustion events and differentiating abnormal combustion events due to knocking from those indicative of pre-ignition. For example, input from an in-cylinder knock sensor and a crankshaft acceleration sensor may be combined to indicate an abnormal combustion event in the cylinder. The knock sensor may be an accelerometer on the engine block, or an ionization sensor configured in the spark plug of each cylinder. Based on the knock sensor signal, such as a signal timing, amplitude, intensity, frequency, etc., and/or based on the crankshaft acceleration signal, the controller may identify pre-ignition. For example, pre-ignition may be indicated in response to an earlier, larger, and/or more frequent signal from the knock sensor while knock may be indicated in response to a later, smaller, an/or less frequent signal from the knock sensor. Additionally, pre-ignition may be distinguished from knock based on the engine operating conditions at the time of abnormal combustion detection. For example, abnormal combustion detected at higher engine speeds and loads may be attributed to knocking while those at lower engine speeds and loads may be indicative of pre-ignition. As such, mitigating actions taken to address knock may differ from those taken by the controller to address pre-ignition. For example, knock may be addressed using spark retard and EGR. Pre-ignition addressing actions are further elaborated herein with reference to FIGS. 2-7.

Controller 12 is shown in FIG. 1 as a microcomputer, including microprocessor unit 106, input/output ports 108, an electronic storage medium for executable programs and calibration values shown as read only memory chip 110 in this particular example, random access memory 112, keep alive memory 114, and a data bus. Controller 12 may receive various signals from sensors coupled to engine 10, in addition to those signals previously discussed, including measurement of inducted mass air flow (MAF) from mass air flow sensor 122; engine coolant temperature (ECT) from temperature sensor 116 coupled to cooling sleeve 118; a profile ignition pickup signal (PIP) from Hall effect sensor 120 (or other type) coupled to crankshaft 140; throttle position (TP) from a throttle position sensor; absolute manifold pressure signal (MAP) from sensor 124, cylinder AFR from EGO sensor 128, and abnormal combustion from a knock sensor and a crankshaft acceleration sensor. Engine speed signal, RPM, may be generated by controller 12 from signal PIP. Manifold pressure signal MAP from a manifold pressure sensor may be used to provide an indication of vacuum, or pressure, in the intake manifold.

Storage medium read-only memory 110 can be programmed with computer readable data representing instructions executable by processor 106 for performing the methods described below as well as other variants that are anticipated but not specifically listed.

Engine controller 12 may be configured to anticipate pre-ignition based on engine operating conditions and to limit an engine load based on a feed-forward likelihood of pre-ignition. As elaborated herein with reference to FIG. 3, a stochastic model may be used to determine a likelihood of pre-ignition based on engine operating conditions such as engine manifold pressure, temperature, fuel octane content, and lambda, and further based on an engine's pre-ignition history. The pre-ignition history may be used to determine a pre-ignition count representative of pre-ignition occurrences over the lifetime of the vehicle, over a given engine drive cycle, as well as a consecutive number of pre-ignition occurrences. In response to a pre-ignition event, the pre-ignition history and pre-ignition count may be updated, and the updated information may be used to adjust the pre-ignition likelihood computed by the stochastic model in a closed-loop fashion. The pre-ignition event may itself be indicated based on the input from multiple sensors. Weighting factors may be used to determine a confidence in a signal being indicative of a pre-ignition combustion event. Based on the indication of a pre-ignition event, a cylinder fuel enrichment operation may be immediately performed to provide a faster response to pre-ignition, while the engine load may be further limited to provide a slower response to the pre-ignition. By using a faster fuel injection based approach and a slower engine load based approach to address pre-ignition, further occurrences of pre-ignition may be reduced.

Figure 2:
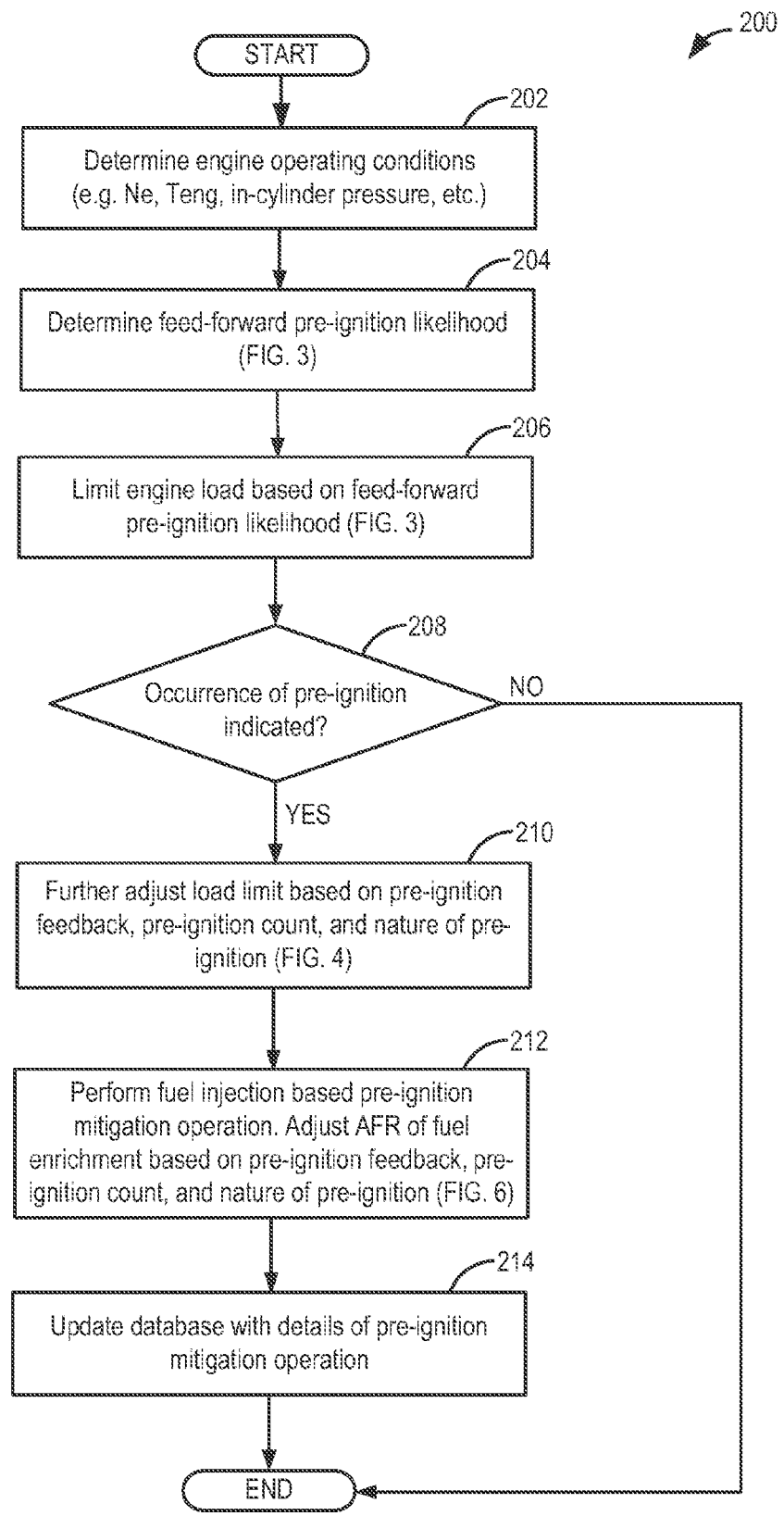
FIG. 2 shows a high level flow chart for addressing pre-ignition based on a feed-forward likelihood of pre-ignition, as well as based on pre-ignition feedback.

Now turning to FIG. 2, an example routine 200 is described for addressing cylinder pre-ignition using preemptive steps based on a feed-forward likelihood, and reactive steps in response to an occurrence of pre-ignition.

At 202, engine operating conditions may be determined. These may include, for example, engine speed, torque, engine load, engine temperature, engine manifold pressure, air temperature, etc. At 204, and as further elaborated with reference to FIG. 3, a feed-forward pre-ignition likelihood may be determined based on the estimated engine operating conditions and further based on an engine pre-ignition history. At 206, the engine load may be limited based on the feed-forward likelihood of pre-ignition. As further elaborated in FIG. 3, this may include reducing an amount of aircharge delivered to the engine, and also slowing ramping in the limited engine load so as to reduce the occurrence of sudden abnormal combustion events. Limiting the engine load may include reducing the air flow by decreasing a throttle opening, adjusting a wastegate timing, valve timing, and/or cam timing, or reducing boost.

However, even after limiting engine load, pre-ignition may still occur. At 208, an occurrence (or indication) of cylinder pre-ignition may be confirmed. The indication of pre-ignition may be based on one or more of a cylinder pressure, knock intensity, crankshaft acceleration, and spark plug ionization. If no cylinder pre-ignition occurs, or no indication of cylinder pre-ignition is determined, the routine may end with the engine being operated with the limited load. However, if an indication of cylinder pre-ignition is confirmed, then at 210, the engine load may be further limited. The limiting may be based on the pre-ignition feedback, an updated pre-ignition count, and the nature of the detected pre-ignition. As elaborated herein with reference to FIG. 4, pre-ignition may be indicated based at least on crankshaft acceleration and knock intensity, and accordingly a pre-ignition history, including a pre-ignition count, may be updated in the database. As further elaborated in FIG. 7, an amount and rate of load limiting may be adjusted based on whether the pre-ignition is of a persistent nature or intermittent nature, whether a threshold number of pre-ignition events have occurred, the pre-ignition count, etc. Further limiting the load may include further reducing an air flow by reducing a boost provided by a boosting device (such as a turbocharger), reducing a throttle opening, and/or adjusting a camshaft timing of a variable cam timing mechanism to thereby further adjust a valve timing. As such, the load limiting may be a slower response to the pre-ignition occurrence since it may require the engine air flow to stabilize.

At 212, also in response to the occurrence of pre-ignition, a fuel injection based pre-ignition mitigation operation may be performed. Specifically, the cylinder may be enriched to provide a substantially immediate cylinder charge cooling effect to mitigate the pre-ignition. The enrichment profile of the fuel injection, such as a degree of richness, an air-to-fuel ratio, and a duration of enriching, may be adjusted based on the indication of pre-ignition, the pre-ignition feedback, the updated pre-ignition count, and the nature of the pre-ignition. For example, where the indication of pre-ignition is based at least on a knock intensity, the enrichment may be adjusted based on the knock intensity. For example, a degree of richness and duration of the enrichment may be increased as the knock intensity (at the time of pre-ignition indication) increases. As elaborated in FIG. 6, by adjusting the enrichment responsive to the pre-ignition details, the pre-ignition may be addressed more or less aggressively, as required. Following the enrichment, to compensate for potential drop in catalytic converter efficiency due to low exhaust feed-gas oxygen levels, the fuel injection operation may further include a subsequent enleanment. Specifically, the cylinder may be enleaned, an enleanment profile of the fuel injection, such as a degree of leanness, an air-to-fuel ratio, and a duration of enleaning, may be adjusted based on the preceding enrichment.

Additionally, or optionally, the engine controller may be configured to adjust an amount of spark advance for the affected cylinder, and/or other cylinders. For example, spark may be advanced by an amount, relative to the spark timing at the time of pre-ignition detection, towards MBT. The amount of spark advance may be adjusted based on one or more of the engine speed and the enrichment. In one example, as the degree of richness and/or duration of the enrichment increases, the amount of spark advance may be increased. Since the cylinder may be more tolerant to spark advance due to the richer than stoichiometry air-to-fuel ratio during the enrichment, spark advance may be advantageously used in conjunction with the enrichment to maintain IMEP under the rich conditions of the cylinder. In one example, spark advance may be modified for the whole engine. In another example, spark advance may be modified for the affected cylinder while spark advance may be frozen for the remaining cylinders. In still another example, spark advance may be frozen for the whole engine.

While the depicted example shows the cylinder being enriched and an engine load being limited in response to a similar indication of pre-ignition, in an alternate embodiment, the enrichment and the load limiting may be performed responsive to differing indications of pre-ignition, the different indications having different thresholds. For example, in response to a first indication of pre-ignition in a cylinder, the first indication higher than a first threshold, the cylinder may be enriched. In comparison, in response to a second indication of pre-ignition in the cylinder, the second indication higher than a second threshold, the cylinder may be enriched and an engine load of the cylinder may be limited. Herein, the second threshold may be higher than the first threshold. In one example, where the indication of pre-ignition in a cylinder is based on a knock intensity of the cylinder, cylinder pre-ignition may be addressed by only enriching the cylinder when the knock intensity exceeds a first, lower threshold. In comparison, cylinder pre-ignition may be addressed by enriching the cylinder and limiting an engine load of the cylinder when the knock intensity exceeds a second, higher threshold.

At 214, the database may be updated with the details of the current pre-ignition mitigation operation. This may include updating one or more pre-ignition counts, details of the amount of load limiting used to address the pre-ignition, details of the enrichment used to address the pre-ignition, as well as an efficacy of the methods used in addressing the pre-ignition. As such, as an occurrence of pre-ignition in a cylinder increases, the propensity of that cylinder to pre-ignite again may also increase. Thus, updating the database with details of the cylinder pre-ignition, future pre-ignition events may be better anticipated and better addressed. For example, as the pre-ignition count of a given cylinder increases, the amount of feed-forward load limiting of that cylinder (or bank) may be increased (for example, relative to a previous cycle). Additionally, in the event of a further occurrence of pre-ignition in that cylinder, despite the load limiting, the fuel injection in the cylinder may be made more rich, or may be prolonged for a longer duration. In this way, feed-forward and feedback methods may be used to better anticipate and better address cylinder pre-ignition.

It will be appreciated that along with the pre-ignition mitigating steps, additional steps may be taken to preemptively address the NVH and vibrations arising during a pre-ignition event. For example, the engagement of a torque converter clutch and/or a power-shift clutch may be adjusted in engine speed-load regions where there is a high likelihood of pre-ignition to reduce the transmission of tactile driveline vibrations. In one example, an amount of torque converter slip may be increased during regions where the engine load is close to load limits to mitigate the driveline NVH of a pre-ignition event, if such an event should occur. In one example, the torque converter slip may be adjusted in an open-loop manner. As such, by adjusting the torque converter slip, hydraulic damping of the tactile impact of a first pre-ignition event may be increased, thereby improving the drive quality felt by the vehicle operator.

Figure 3:
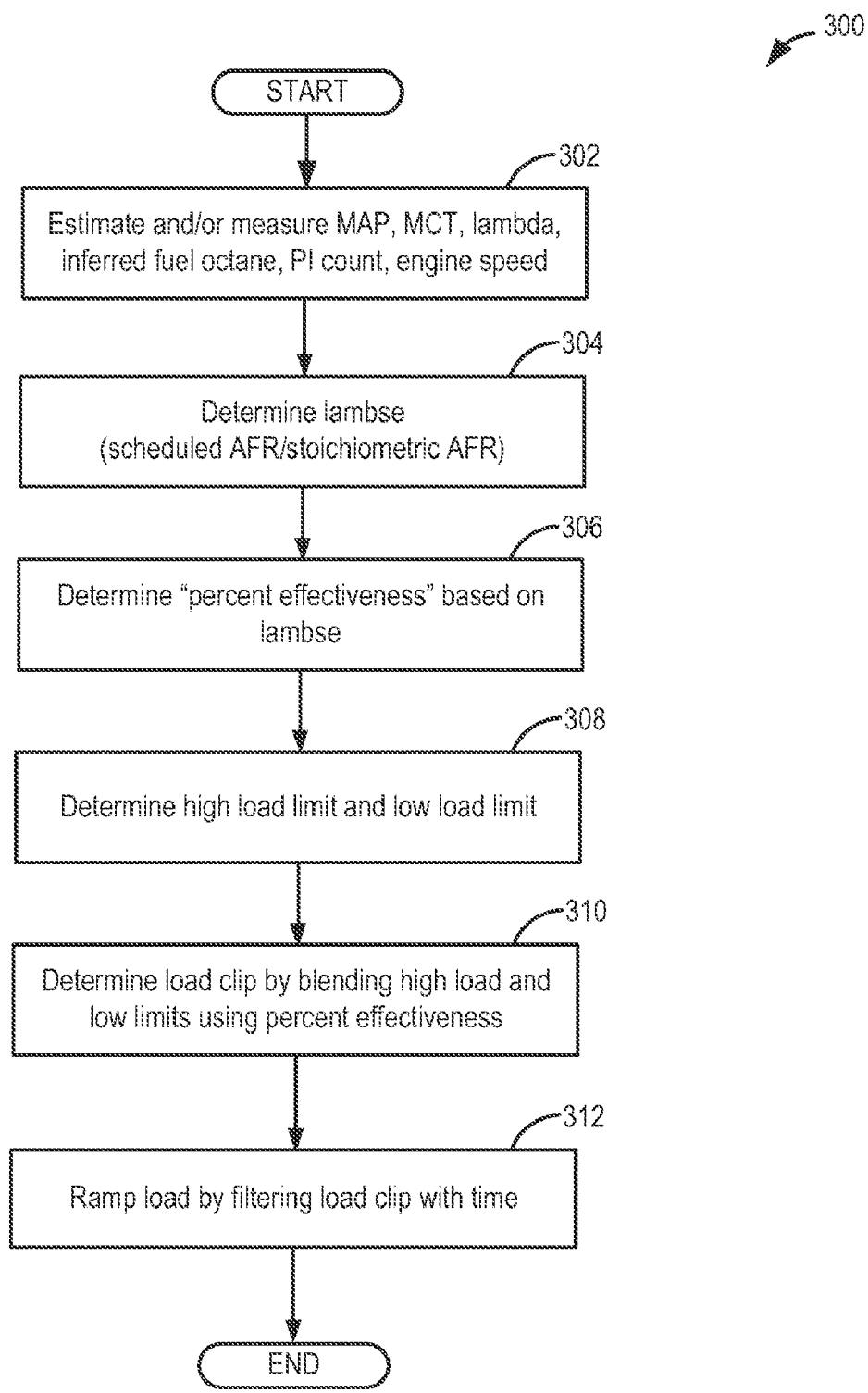
FIG. 3 shows a high level flow chart for limiting an engine load in response to a feed-forward likelihood of engine pre-ignition.

Now turning to FIG. 3, an example routine 300 is described for estimating a likelihood of pre-ignition, based on engine operating conditions and an engine pre-ignition history. By determining a feed-forward likelihood of pre-ignition, an engine load may be limited preemptively based on a cylinder's propensity to pre-ignite, thereby reducing an occurrence of pre-ignition related abnormal combustion events.

At 302, the routine includes estimating, inferring, and/or measuring manifold pressure (MAP), manifold aircharge temperature (MCT), air-fuel ratio (lambda), fuel octane content, engine speed (and load), and a pre-ignition count. In one example, the pre-ignition count may include at least an engine trip PI count and an engine lifetime PI count. The engine trip PI count may include an estimate of a total number of pre-ignition events in the engine over the present trip, or engine cycle. The engine lifetime PI count may include an estimate of the total number of pre-ignition events in the engine over the lifetime of engine operation. As such, the engine lifetime PI count and the engine trip PI count may be obtained based on individual cylinder lifetime and trip PI counts. The PI count may indicate each cylinder's pre-ignition history and may correlate with each cylinder's propensity to further pre-ignition. Thus, based on a combination of each cylinder's PI count, the engine's propensity for pre-ignition may be estimated. As further elaborated herein, the pre-ignition history and count of each cylinder, and thus the engine, may be updated at the end of each cycle, and may be used to determine how to adjust an enrichment profile and a load limiting in the event of cylinder pre-ignition occurrence.

At 304, the routine may include determining a lambse. In one example, lambse may be determined by comparing the scheduled air-to-fuel ratio with the stoichiometric air-to-fuel ratio. At 306, a "percent effectiveness" of pre-ignition (that is, a possibility of pre-ignition) may be determined based on the calculated lambse. In general, at air-to-fuel ratios rich of stoichiometry, the propensity to pre-ignite may decrease. Similarly, at air-to-fuel ratios lean of stoichiometry, the propensity to pre-ignite may also decrease. However, at air-to-fuel ratios slightly lean of stoichiometry, the propensity to pre-ignite may increase.

At 308, a high load limit and a low load limit for the engine may be determined. In one example, the high load limit may be estimated from a high load limit table which uses manifold charge temperature (MCT) and engine speed (Ne) and computes load limits for "ideal" conditions, and/or with a high fuel octane. Similarly, the low load limit may be estimated from a low load limit table which also uses manifold charge temperature (MCT) and engine speed (Ne) and computes load limits for "compromised" conditions, and/or with a low fuel octane. At 310, a load clip may be determined by using the "percent effectiveness" to blend the outputs from the high load and low load limit tables. For example, the percent effectiveness output by the controller may be a number between 0 and 1 and may be used as an interpolation multiplier between the computed high load and low load limits. At 312, the determined load clip, or load limit, may be ramped in slowly so as to reduce torque disturbances. Specifically, the load clip may be filtered (for example, using a rolling average filter) over time (for example, using a filter constant) to slowly ramp the determined load clip. The controller may coordinate the load ramping with the engine's fuel injection operation to reduce torque disturbances. In this way, by determining a feed-forward likelihood of pre-ignition, and by reducing an engine load and/or air flow based on the likelihood of pre-ignition, the occurrence of abnormal pre-ignition related combustion events may be reduced.

However, even after limiting the load, and ramping the load slowly, there is potential to have some pre-ignition events based on the real-time engine operating conditions. Thus, in response to a sudden occurrence of cylinder pre-ignition, an engine controller may be configured to further limit the load and to enrich the cylinder by performing a fuel injection based pre-ignition mitigation operation. Due to delays in the engine system, reducing load and/or air flow is a relatively slow responding control mechanism. The delays may be attributed to effects such as manifold filling effects and a time constant required for reaching a stable airflow. Thus, the impact of load reduction on reducing the probability of pre-ignition may be delayed until the airflow stabilizes. In comparison, enrichment based adjustments may have a faster impact since an amount of fuel delivered to the cylinder may be varied from zero (at cylinder shut-off) to richer than the air-fuel set-point (that is, richer than stoichiometry) substantially immediately. As elaborated with reference to FIG. 6, by immediately enriching fuel in a cylinder wherein pre-ignition is indicated, cylinder air charge cooling may be immediately enabled, thereby quickly reducing the probability of further abnormal pre-ignition related combustion events in the cylinder.

Figure 4:
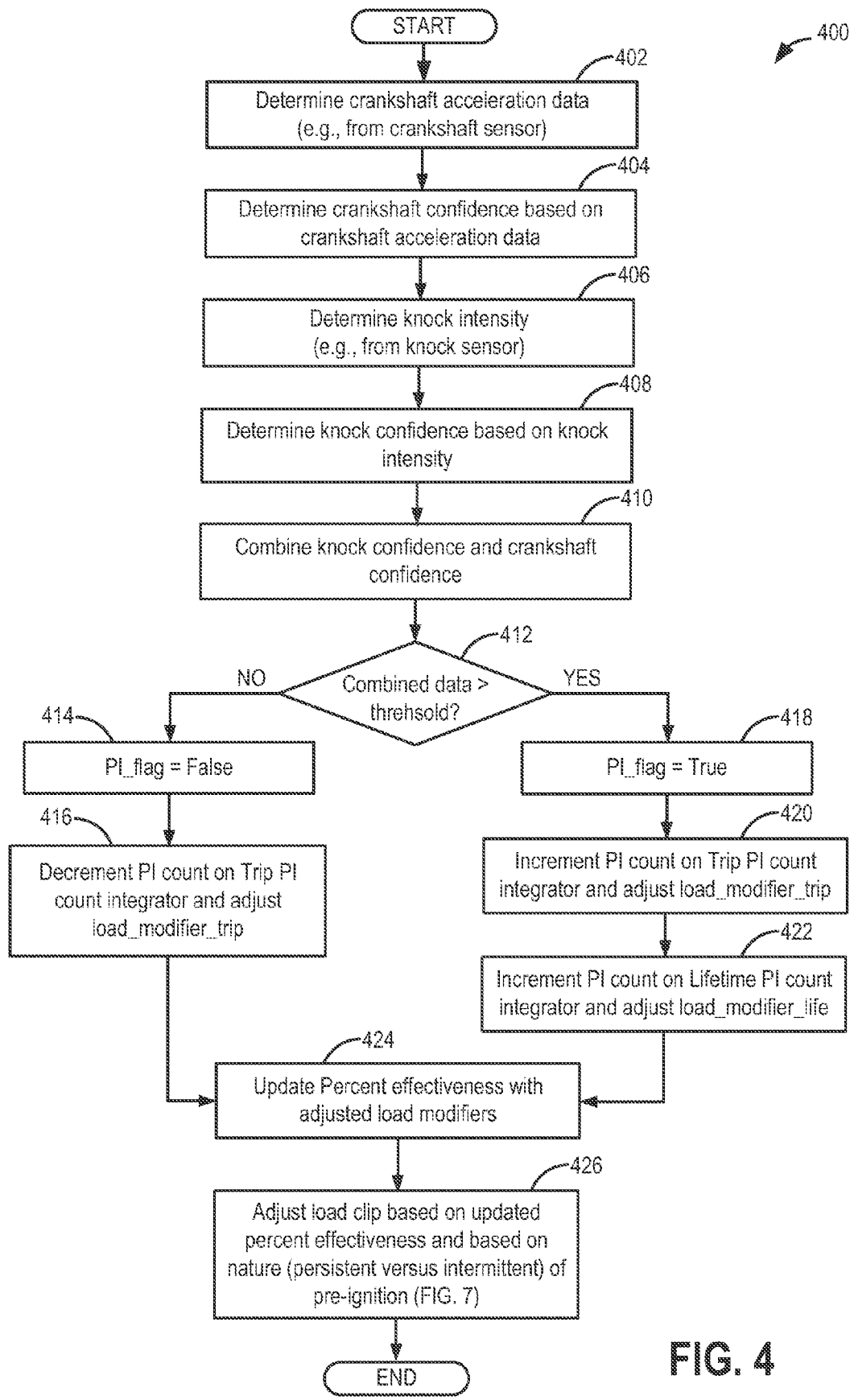
FIG. 4 shows a high level flow chart for updating a pre-ignition count, and further limiting an engine load in response to an indication of pre-ignition.

Now turning to FIG. 4, an example routine 400 is described for identifying and indicating a pre-ignition related abnormal combustion event, updating a pre-ignition count, and further limiting an engine load based on the indication of pre-ignition.

At 402, crankshaft acceleration data may be determined, for example, based on the output from a crankshaft acceleration sensor. At 404, the crankshaft acceleration data may be processed to determine a crankshaft confidence. As such, the crankshaft confidence may represent a potential for pre-ignition based on the crankshaft acceleration data. In one example, the controller may use a function receiving inputs from an engine speed and load table along with the crankshaft acceleration data to determine the crankshaft confidence. The function may be populated such that, for a given engine speed and load combination, cells where the crankshaft acceleration data has a higher signal to noise ratio will result in a higher crankshaft confidence number, while cells where the crankshaft acceleration data is more prone to noise (such as, from crankshaft torsional vibrations) will result in a lower crankshaft confidence number.

At 406, knock intensity may be determined, for example, based on the output from a knock sensor. At 408, the knock intensity may be processed to determine a knock confidence representative of a potential for pre-ignition based on the knock data. As such, the knock confidence may be determined in a manner similar to the crankshaft confidence. Specifically, the controller may use a function receiving inputs from an engine speed and load table along with the knock data to determine the knock confidence. The function may be populated such that, for a given engine speed and load combination, cells where the knock intensity has a higher signal to noise ratio (for example, higher than a threshold) will result in a higher knock confidence number, while cells where the knock data is more prone to noise (for example, higher mechanical engine noise) will result in a lower knock confidence number.

At 410, the knock confidence and crankshaft confidence outputs may be combined, and at 412, the combined output may be compared to a threshold. In one example, the knock confidence and the crankshaft confidence may be given equal weightage. In another example, a weighting factor of the knock confidence may be different from the weighting factor of the crankshaft confidence, the weightages varied based on operating conditions. For example, at higher engine speeds, where knocking may be more prevalent, the knock confidence may be given higher weightage. If the combined output is greater than the threshold, then at 418, it may be determined that a pre-ignition event has occurred and a pre-ignition flag (PI_flag) may be set to true. The output of the pre-ignition flag may then be integrated into at least two different integrators. At 420, the output may be integrated on a trip pre-ignition count integrator (including a cylinder trip pre-ignition count integrator and an engine trip pre-ignition integrator) that counts the number of pre-ignition events in the current drive cycle (for the cylinder and engine respectively). Specifically, the pre-ignition (PI) count on the Trip PI count integrator may be incremented and the updated count may be used to adjust a trip load modifier output of the integrator (load_modifier_trip). At 422, the output may be integrated on a lifetime pre-ignition count integrator (including a cylinder lifetime pre-ignition count integrator and an engine lifetime pre-ignition integrator) that counts the number of pre-ignition events in the life of the vehicle engine. Specifically, the pre-ignition (PI) count on the Lifetime PI count integrator may be incremented and the updated count may be used to adjust a lifetime load modifier output of the integrator (load_modifier_life).

In comparison, if the combined output at 412 is not greater than the threshold, then at 414, it may determined that a pre-ignition event has not occurred and the pre-ignition flag (PI_flag) may be set to false. The output of the pre-ignition flag may then be integrated into the trip PI count integrator. Specifically, the PI count on the Trip PI count integrator may be decremented, or may remain unchanged, and the updated count may be used to adjust the trip load modifier output of the integrator.

At 424, the updated load modifier outputs from the trip PI count and lifetime PI count integrators may be used to update the percent effectiveness of the engine. At 426, based on the updated percent effectiveness, the load clip may be adjusted. For example, as the pre-ignition count increases, the engine load may be further limited, and the further limited load clip may be ramped in slowly. For example, the updated load clip may be filtered with an updated rolling average filter and an updated filter time constant to reduce torque disturbances and a harsh feel. As such, the further limiting of engine load may be performed alongside the fuel injection based pre-ignition mitigation operation. Thus, in one example, an engine controller may be configured to co-ordinate the fuel injection operation with ramping of the limited engine load. For example, the ramp-in rate of the limited load may be adjusted based on the duration of the fuel injection enrichment, and a flag may be set when ramping in of the limited engine load is completed. The engine controller may use the flag to stop a pre-ignition mitigating fuel enrichment operation. In other words, the amount of fuel injected during the fast response fuel injection pre-ignition mitigation may be phased in together with the slower response load reduction.

Figure 7:
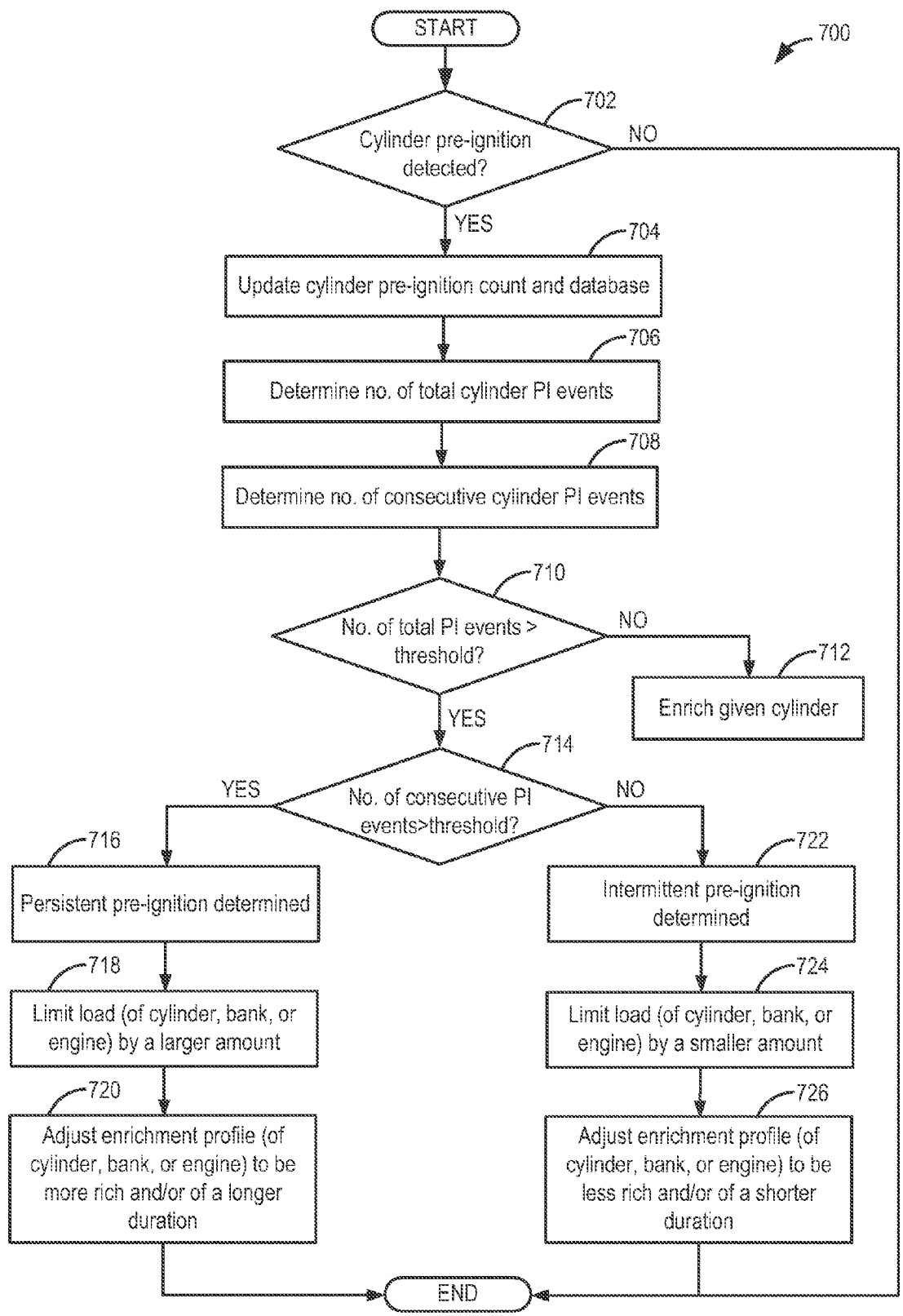
FIG. 7 shows a high level flow chart for adjusting an enrichment profile and a load limiting in a cylinder, bank, or engine, based on a pre-ignition count and nature of pre-ignition.

As further elaborated with reference to FIG. 7, at 424, the load clip may also be adjusted based on the nature of the pre-ignition. For example, based on whether the pre-ignition is intermittent or persistent in nature. The nature of the pre-ignition may be inferred from the pre-ignition count. For example, based on a number of consecutive pre-ignition events over a plurality of consecutive cylinder combustion events, the intermittent or persistent nature of the pre-ignition may be discerned, and a load limiting and enrichment operation may be accordingly adjusted. For example, as a number of consecutive pre-ignition events exceeds a threshold, persistent pre-ignition may be determined, and the load may be more limited relative to intermittent pre-ignition.

It will be appreciated that while the depicted example adjusts the pre-ignition count, and consequently the pre-ignition mitigating operations based on a number of pre-ignition events over a drive cycle, in alternate embodiments, the pre-ignition count may be determined based on a number of pre-ignition events over a key cycle, a predetermined amount of time, or a mileage. In one example, the mileage used may be the total mileage of the vehicle over the lifetime of the vehicle, or over the current trip. In another example, the pre-ignition count may be adjusted based on a mileage since a preceding pre-ignition event. For example, a pre-ignition count may be decremented if a single pre-ignition event is determined to occur after a threshold mileage since a preceding pre-ignition event. In another example, when multiple pre-ignition events are detected (such as during persistent or intermittent pre-ignition), the count and pre-ignition mitigation (enrichment, load limiting, etc) associated with the detected pre-ignition event may be reduced as the mileage between successive multiple pre-ignition events exceeds a threshold.

In this way, by updating a pre-ignition count in response to an occurrence of pre-ignition and limiting an engine load based on the pre-ignition feedback, pre-ignition may be better addressed.

Figure 5:
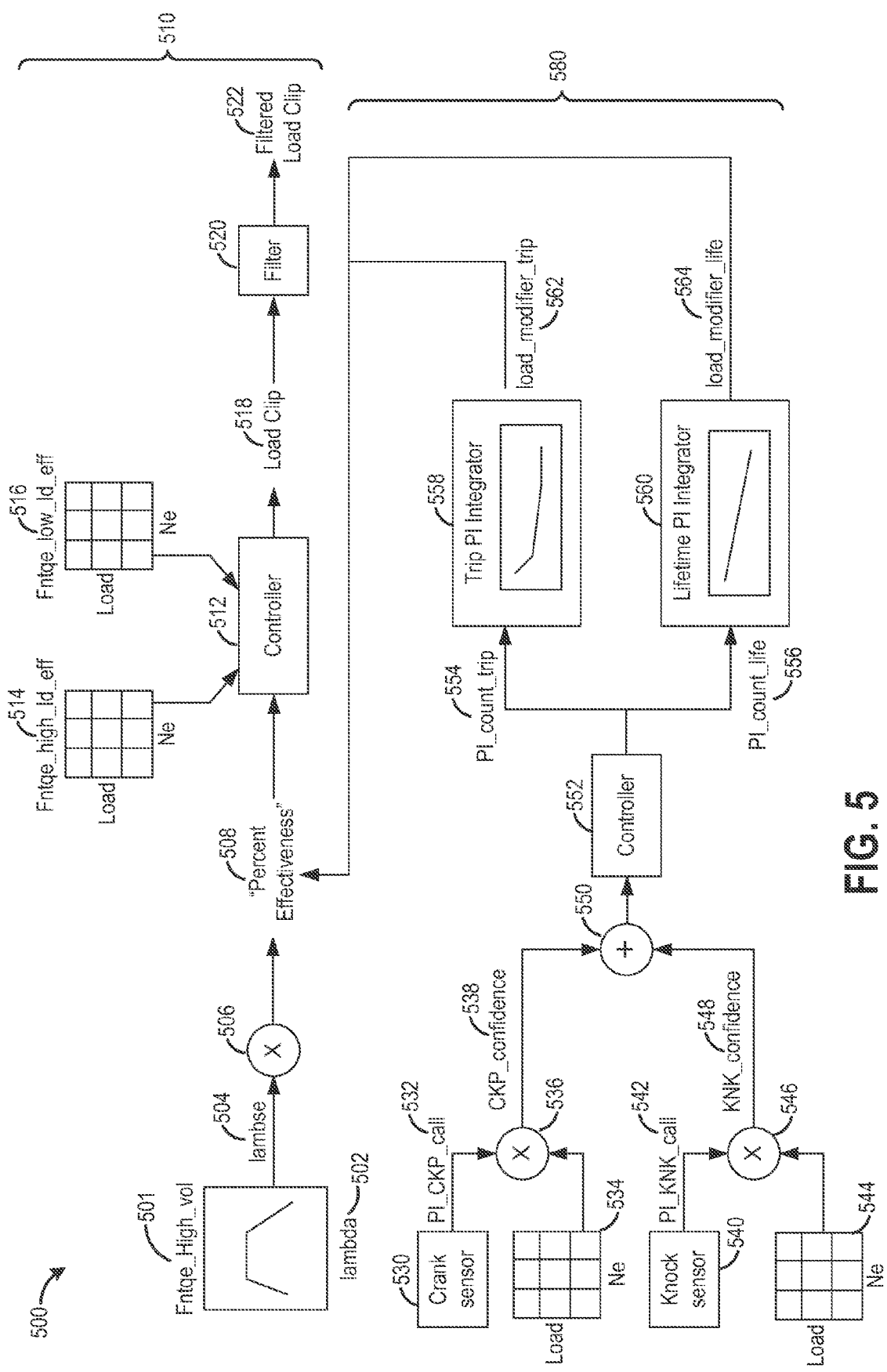
FIG. 5 shows a schematic depiction of a pre-ignition mitigation routine.

FIG. 5 shows a schematic representation of feed-forward and feedback limiting of an engine load in response to pre-ignition. As such, the figure is an alternate depiction of the routines of FIGS. 2-4. Method 500 comprises, at sub-routine 510 (and as elaborated previously in FIG. 4), determining a feed-forward likelihood of pre-ignition and limiting an engine load based on the feed-forward likelihood, to thereby reduce an occurrence of a cylinder pre-ignition event. Method 500 further comprises, at sub-routine 580, determining and indicating the occurrence of a cylinder pre-ignition event, and further limiting the engine load based on feedback from the occurrence. As such, sub-routine 510 may be performed under conditions when pre-ignition has not been detected, that is, in anticipation of pre-ignition. In comparison, sub-routine 580 may be additionally performed in response to an indication of a pre-ignition event.

Sub-routine 510 includes comparing a scheduled air-to-fuel ratio 501 (Fntqe_High_vol) with a set air-to-fuel ratio, lambda 502, (such as, a stoichiometric air-to-fuel ratio), to determine a lambse 504. The lambse may then be processed through multiplier 506 to determine percent effectiveness 508. As such, percent effectiveness 508 may be representative of a propensity for pre-ignition, and may be output as a number between 0 (no likelihood of pre-ignition) and 1 (high risk of pre-ignition). Percent effectiveness 508 may be used as an interpolation multiplier between a high load limit 514 and a low load limit 516 to determine a load clip 518. High load limit 514 (Fntqe_high_ld_eff) may be calculated using a table of engine load versus engine speed under "ideal" conditions (with high fuel octane). Low load limit 516 (Fntqe_low_ld_eff) may be calculated using a similar table of engine load versus engine speed under "compromised" conditions (with low fuel octane). Controller 512 may blend the high speed limit 514 and the low speed limit 516 using percent effectiveness 508. In one example, controller 512 may blend the limits using an equation as follows, Tqe_ld_limit_tmp=(tqe_pct_eff_tmp*tq_ld_low_eff)+ ((1−tqe_pct_eff_tmp)*tq_ld_high_eff), wherein Tqe_ld_limit_tmp is the load clip in anticipation of pre-ignition, tqe_pct_eff_tmp is the percent effectiveness in the absence of a pre-ignition event, tq_ld_low_eff is the low load limit and tq_ld_high_eff is the high load limit.

Load clip 518 may be further processed through filter 520 to generate filtered load clip 522. Filtered load clip 522 may include a ramping rate for the load so as to reduce torque disturbances. In one example load clip 518 may be rolling average filtered with a time constant to obtain filtered load clip 522.

In the event of a pre-ignition event, sub-routine 580 may be performed to update the percent effectiveness with load multipliers, thereby further limiting the load clip of sub-routine 510. Sub-routine 580 may include identifying pre-ignition based on the output of a crankshaft acceleration sensor 530 and a knock sensor 540. However, in alternate embodiments, pre-ignition may be identified based on the output of one or more other sensors. The output of crankshaft acceleration sensor 530 may be compared to a threshold to determine a crankshaft pre-ignition call (PI_CKP_call) 532. As such, PI_CKP_call 532 may have a value of either 0, when the output is below the threshold (that is, no crankshaft data based pre-ignition called) or a value of 1, when the output is above the threshold (that is, crankshaft data based pre-ignition called). Similarly, the output of knock sensor 540 may be compared to a threshold to determine a knock pre-ignition call (PI_KNK_call) 542. As such, PI_KNK_call may have a value of either 0, when the output is below the threshold (that is, no knock data based pre-ignition called) or a value of 1, when the output is above the threshold (that is, knock data based pre-ignition called).

Crankshaft pre-ignition call 532 may be processed by multiplier 536, based on an engine speed and load table 534, to determine a crankshaft confidence (CKP_confidence) 538. Multiplier 536 may be populated such that cells where the crankshaft acceleration sensor output has a high signal to noise ratio will result in a crankshaft confidence number closer to 1 (that is, a higher confidence of pre-ignition), while cells that are more prone to noise (such as, from crankshaft torsional vibrations) will result in a crankshaft confidence number closer to 0 (that is, a lower confidence of pre-ignition). Similarly, knock pre-ignition call 542 may be processed by multiplier 546, based on an engine speed and load table 544, to determine a knock confidence (KNK_confidence) 548. Multiplier 546 may be populated such that cells where the knock sensor output has a high signal to noise ratio will result in a knock confidence number closer to 1 (that is, a higher confidence of pre-ignition), while cells that are more prone to noise (such as, from mechanical engine noise) will result in a crankshaft knock number closer to 0 (that is, a lower confidence of pre-ignition). The confidence numbers from the crankshaft acceleration method and the knock methods may be combined by adder 550 and compared to a threshold by controller 552 to determine if there is a pre-ignition event. If the combined output analyzed at controller 552 is greater than the threshold, then a pre-ignition event may be confirmed and the data related to the pre-ignition event may be used to address the pre-ignition. Specifically, a fuel injection based mitigation operation may be performed wherein the very next combustion event, and a defined number of combustion events thereafter, are enriched to reduce the propensity of pre-ignition.

Further, pre-ignition feedback data may be routed to sub-routine 510 wherein it may be used to adjust the filtered load clip of sub-routine 510. If the combined output is not greater than the threshold, no pre-ignition event may be confirmed, and an engine controller may continue to operate the engine with the (unadjusted) filtered load clip of sub-routine 510.

In this way, sensor information from various sensors may be combined to enable a more robust detection of pre-ignition and to enable a more robust distinction of pre-ignition related abnormal combustion events from non pre-ignition related abnormal combustion events (such as misfires and knocking). Furthermore, by using the output from multiple sensors, shortfalls in a given sensor under certain engine operating conditions may be overcome by the presence of other sensors, and pre-ignition may be detected even in the presence of degradation in one of the various sensors.

Upon confirming a pre-ignition event, controller 552 may set a pre-ignition flag, and may process the flag data through at least two different integrators including a trip pre-ignition (PI) integrator 558 and a lifetime pre-ignition (PI) integrator 560. As such, the trip PI integrator may count the number of pre-ignition events in the current drive cycle (that is, from key-on engine start to key-off), and may be reset at each key-off event. Thus, in response to a pre-ignition event in the drive cycle, a trip pre-ignition count 554 (PI_count_trip) may be incremented by trip PI integrator 558. In one example, trip pre-ignition count 554 may include at least a cylinder trip pre-ignition count for each cylinder (or each group of cylinders), as well as an overall engine trip pre-ignition count based on the individual cylinder trip pre-ignition counts. If no pre-ignition event occurs over at least a duration of the drive cycle, the trip pre-ignition count may be decremented. Alternatively, if no pre-ignition event occurs, the pre-ignition count may be maintained unchanged. In comparison, lifetime PI integrator 560 may count the number of pre-ignition events in the life of the vehicle. Thus, in response to a pre-ignition event in the drive cycle, a lifetime pre-ignition count 556 (PI_count_life) may be incremented by lifetime PI integrator 560. In one example, lifetime pre-ignition count 556 may include at least a cylinder lifetime pre-ignition count for each cylinder (or each group of cylinders), as well as an overall engine lifetime pre-ignition count based on the individual cylinder lifetime pre-ignition counts.

Trip PI integrator 558 may generate a trip load modifier 562 (load_modifier_trip) based on the trip pre-ignition count 554 while lifetime PI integrator 560 may generate a lifetime load modifier 564 (load_modifier_life) based on the lifetime pre-ignition count 556. As such, trip PI integrator 558 may be configured to generate a load modifier to reduce the probability of further pre-ignition occurrences in the same drive cycle, while lifetime PI integrator 560 may be configured to generate a load modifier to counteract changes to the vehicle over time. Consequently, the trip load modifier generated by the trip PI integrator may be a more aggressive function than the lifetime load modifier generated by the lifetime PI integrator. In one example, load modifiers 562 and 564 may have values between 0 (less aggressive) and 1 (more aggressive). The load modifiers may then be used to further adjust percent effectiveness 508, thereby generating an adjusted load clip 518, and an adjusted filtered load clip 522. In this way, the engine load may be further reduced based on pre-ignition feedback from a detected pre-ignition event.

Figure 6:
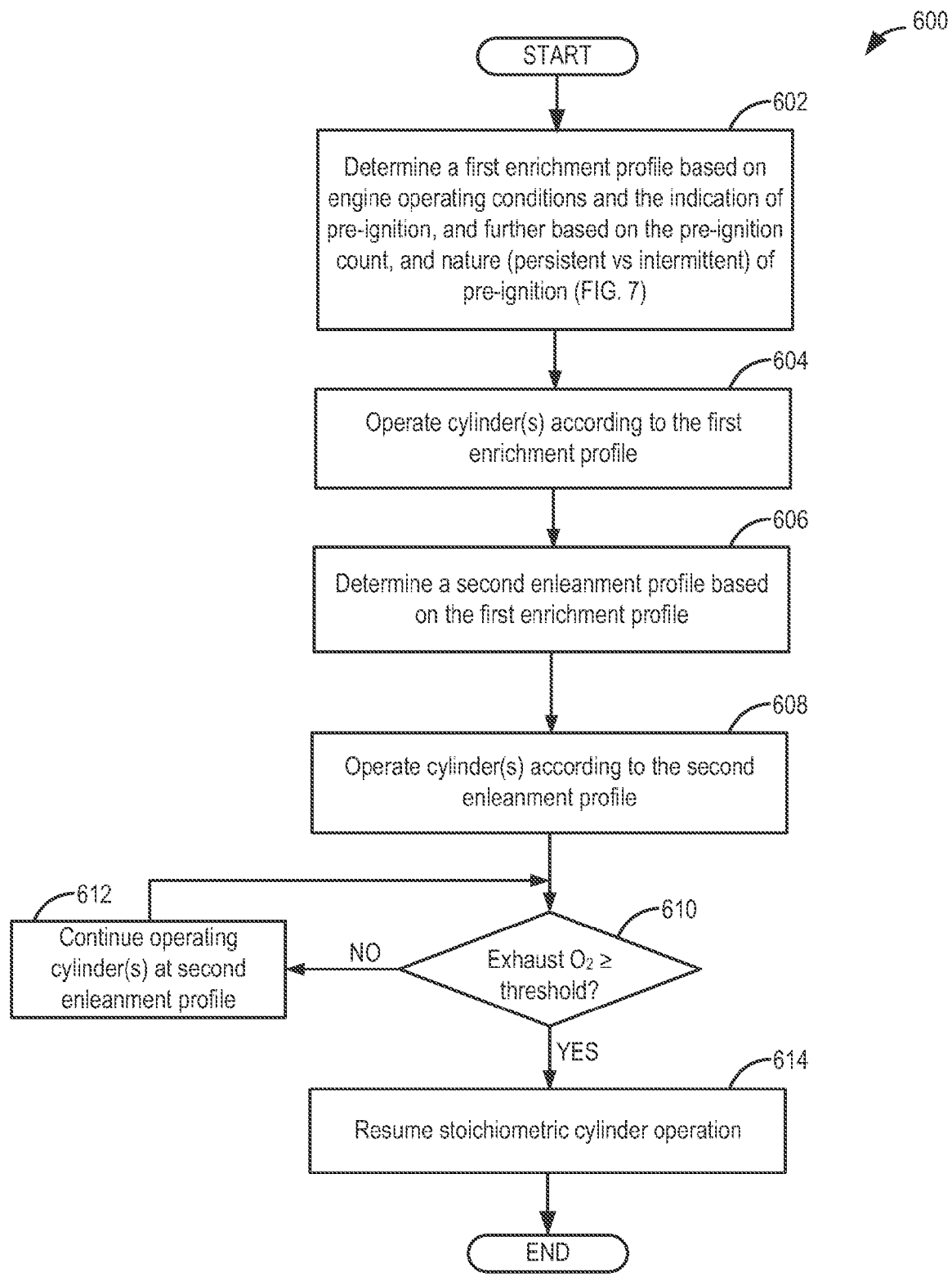
FIG. 6 shows a high level flow chart for executing a fuel injection operation to address pre-ignition, according to the present disclosure.

Now turning to FIG. 6, a routine 600 is described for adjusting a fuel injected into a cylinder in response to an indication of pre-ignition. By enriching a cylinder in response to an occurrence of a cylinder pre-ignition event, a cylinder cooling effect may be immediately achieved to reduce the risk of further abnormal combustion, and engine degradation.

At 602, an engine controller may determine a first enrichment profile based on engine operating conditions and the indication of pre-ignition. As previously elaborated with reference to FIGS. 2-4, the indication of pre-ignition may include a feed-forward pre-ignition likelihood determined based on engine operating conditions, as well as a sensor-based (such as, a knock sensor and crankshaft acceleration sensor based) pre-ignition indication. As further elaborated below with reference to FIG. 7, the enrichment profile may be further based on the pre-ignition count of the cylinder, as well as the nature of the pre-ignition (such as, based on whether the pre-ignition is intermittent or persistent in nature).

The first enrichment profile may include, for example, a first air to injected fuel ratio (AFR) richer than stoichiometry, a degree of richness of the AFR, and a first duration for the rich fuel injection adjusted based on the engine operating conditions. The first duration may be, for example, a first number of combustion events. Additionally or optionally, the enrichment profile may include a rate of enrichment (that is, a rate of change of rich AFR) over the first duration.

In one example, the first enrichment profile may include a longer first duration and/or a higher degree of richness of the first air-to-fuel ratio as an indication of pre-ignition increases. For example, where the indication of pre-ignition is based at least on an in-cylinder pressure, or knock intensity, the adjustment of the profile may include increasing the first duration and/or increasing the degree of richness of the air-to-fuel ratio as a cylinder pressure, or knock intensity at the time of pre-ignition detection exceeds a threshold. In another example, the degree of richness and/or the duration of enrichment may be increased as a cylinder pre-ignition count increases (e.g., exceeds a threshold). In still another example, the degree of richness and duration may be increased more in response to persistent pre-ignition, and may be increased less in response to intermittent pre-ignition.

In one example, the enrichment may also be coordinated with the load limiting operation (of FIG. 4). For example, a ramp—in rate for the limited load may be adjusted based on the first duration of the enrichment and/or the rate of enrichment over the first duration such that the enrichment operation and the load ramping in are completed substantially simultaneously. In one example, a flag may be set when ramping in of the limited engine load is completed. The engine controller may use the flag to stop the enrichment operation accordingly so that the amount of fuel injected during the fast response pre-ignition mitigating enrichment operation can be phased in together with the slower response load reduction.

At 604, the controller may fuel and operate the cylinder according to the first enrichment profile. For example, the cylinder may be operated with the first air-to-fuel ratio richer than stoichiometry for the first duration. In another example, the cylinder may be enriched at a first rate of enrichment, and the cylinder may be operated with an air-to-fuel ratio richer than stoichiometry, the air-to-fuel ratio changing at the first rate over the first duration. Herein, by injecting excess fuel into the cylinder, a charge cooling effect may be obtained and cylinder peak pressures may be lowered to reduce the risk of further pre-ignition related abnormal combustion events.

However, the excess fuel immediately injected to mitigate the pre-ignition risk may also deplete exhaust feed-gas oxygen and thereby reduce the catalytic efficiency of emission control device catalytic converters. The excess fuel may also have an adverse impact on exhaust emissions. Thus, to restore the catalytic efficiency of the catalytic converters, at 606, the controller may determine a second enleanment profile based on the first enrichment profile of the preceding enrichment. The second enleanment profile may include, for example, a second air to injected fuel ratio (AFR) leaner than stoichiometry, a degree of leanness of the AFR, a second duration for the enleanment, and a rate of enleanment, each adjusted based on one or more of the first air to fuel ratio and the first duration of the first rich fuel injection profile. The second duration may be, for example, a second number of combustion events. The adjustment may include, for example, increasing the second duration and/or increasing the degree of leanness of the air-to-fuel ratio as one or more of the first duration and a degree of richness of the first air-to-fuel ratio increases.

At 608, after the first duration has elapsed, the controller may fuel and operate the cylinder according to the second enleanment profile. For example, the cylinder may be operated with the second air-to-fuel ratio leaner than stoichiometry for the second duration. In another example, the cylinder may be enleaned at a second rate of enleanment, and the cylinder may be operated with an air-to-fuel ratio leaner than stoichiometry, the air-to-fuel ratio changing at the second rate over the second duration. Herein, by injecting relatively less fuel and relatively more air into the cylinder, the oxygen depletion effect of the preceding enrichment may be compensated for, and catalytic efficiency of the catalytic converter may be restored.

At 610, the exhaust gas oxygen content may be estimated and/or inferred (for example, using an exhaust gas oxygen sensor) and it may be determined whether the exhaust gas oxygen content is above a threshold. The threshold may be an oxygen level above which an emission control device catalyst can operate with substantial catalytic efficiency. If the oxygen content has been restored to the threshold level, then at 614, following the enleanment, the controller may resume operating the cylinder with a third air-to-fuel ratio substantially at stoichiometry. If the oxygen content has not reached the threshold at 610, then at 612, the controller may continue operating the cylinder(s) at the second air-to-fuel ratio until a desired oxygen level and a desired catalytic efficiency is restored. Once the catalytic efficiency is restored, stoichiometric cylinder fuel injections may resume.

In one example, the second duration and degree of leanness of the second enleanment profile may be adjusted such that a threshold exhaust oxygen level is restored by the end of the second duration. For example, the adjustment may include increasing the second duration and/or increasing the degree of leanness of the second air-to-fuel ratio as a total amount of exhaust oxygen consumed over the first duration increases. In another example, where the oxygen consumption over the first duration is inferred from an amount of unburned hydrocarbons (HCs) and carbon monoxide generated, the adjustment may include, increasing the second duration and/or increasing the degree of leanness of the second air-to-fuel ratio as a total amount of exhaust unburned HCs produced over the first duration increases. In either case, after the second duration has elapsed, the controller may resume operating the cylinder with the third substantially stoichiometric air-to-fuel ratio.

In this way, by enriching a cylinder in response to an indication of pre-ignition, the charge-cooling effect of the injected fuel may be used to immediately and rapidly address pre-ignition. By concomitantly limiting an engine load based on the indication of pre-ignition, further occurrences of pre-ignition may be substantially mitigated.

Now turning to FIG. 7, an example routine 700 is described for adjusting the fuel injection profiles for the fuel injection based pre-ignition mitigation operation based on the nature of pre-ignition and/or the pre-ignition count. Specifically, based on a pre-ignition count and a nature of the pre-ignition, an aggressiveness with which the enrichment may be performed may be adjusted. For example, under some pre-ignition conditions, the enrichment may be performed less aggressively in the given affected cylinder only, while in other pre-ignition conditions, the enrichment may be performed more aggressively and may be extended to other cylinders of the bank or engine.

At 702, it may be confirmed that a cylinder pre-ignition event is detected. If not, the routine may end. Upon confirmation, at 704, a pre-ignition count (such as a cylinder and/or engine pre-ignition count) and a pre-ignition database (including details of previous pre-ignition events and pre-ignition mitigating operations) may be updated. As previously elaborated, this may include increasing a pre-ignition count, for example, on a trip pre-ignition counter as well as a lifetime pre-ignition counter. The pre-ignition count may include one or more of a cylinder trip pre-ignition count, a cylinder lifetime pre-ignition count, an engine trip pre-ignition count, an engine lifetime pre-ignition count, a cylinder consecutive pre-ignition count, and an engine consecutive pre-ignition count. The trip pre-ignition counts may be representative of previous pre-ignition events during the same engine cycle/operation, while the lifetime pre-ignition count may be representative of all previous pre-ignition events over the entire duration of vehicle operation.

It will be appreciated that while the depicted example increases the pre-ignition count in response to an occurrence of pre-ignition (over a drive cycle, key cycle, predetermined amount of time, etc.), in alternate embodiments, increasing the pre-ignition count may include increasing the pre-ignition count based on a mileage of the engine. In one example, the mileage used may be the total mileage of the engine, or vehicle (over the lifetime of the vehicle, or over the current trip). In another example, the mileage may include a mileage since a preceding occurrence of pre-ignition in an engine cylinder. For example, the engine pre-ignition count may be increased in response to a mileage of the engine, since a preceding occurrence of engine pre-ignition, exceeding a threshold. In another example, a pre-ignition count may be incremented if a single pre-ignition event is determined to occur after a threshold mileage since a preceding pre-ignition event. In another example, when multiple pre-ignition events are detected (such as during persistent or intermittent pre-ignition), the count and pre-ignition mitigation (enrichment, load limiting, etc) associated with the detected pre-ignition event may be increased as the mileage between successive multiple pre-ignition events exceeds a threshold.

At 706, a total number of cylinder pre-ignition events may be determined, such as, based on the updated pre-ignition counts. At 708, a total number of consecutive cylinder pre-ignition events may be determined (such as, from a consecutive cylinder pre-ignition count). Herein, it may be determined as to how many of all the pre-ignition events that have occurred in the cylinder are consecutive, that is, the frequency of pre-ignition occurrence in different cylinders. At 710, it may be determined whether the total number of cylinder pre-ignition events is greater than a threshold. That is, it may be determined if a pre-ignition count is greater than a threshold. If the total number of cylinder pre-ignition events is not greater than the threshold, then at 712, the given affected cylinder may be enriched according to an enrichment profile based on engine operating conditions and based on the pre-ignition count, as discussed in FIG. 6. In comparison, if a threshold number of pre-ignition events has been exceeded, then at 714, it may determined whether a number of consecutive pre-ignition events (that is, the consecutive pre-ignition count) is also greater than a threshold.

Based on the frequency of pre-ignition occurrence, the nature of the pre-ignition may be determined. In one example, when the number of consecutive pre-ignition events at 714 is greater than the threshold, persistent pre-ignition may be determined at 716. That is, persistent pre-ignition may be concluded in response to a plurality of continuous, uninterrupted pre-ignition events over a plurality of consecutive cylinder combustion events. In comparison, when the number of consecutive pre-ignition events at 714 is less than the threshold, while the total number of pre-ignition events at 710 is greater than a threshold, intermittent pre-ignition may be determined at 722. That is, intermittent pre-ignition may be concluded in response to a plurality of discrete, interrupted pre-ignition events over a plurality of consecutive cylinder combustion events.

In an alternate example, persistent pre-ignition may be determined in response to a continuous and steady increase in the trip and lifetime pre-ignition count of a cylinder, while intermittent pre-ignition may be determined in response to a smaller increase in the trip pre-ignition count for a given increase in the lifetime pre-ignition count. In still another example, persistent pre-ignition may be determined in response to a pre-ignition combustion event on each combustion cycle, while intermittent pre-ignition may be determined in response to a pre-ignition combustion event on every other (or more) combustion cycles.

At 724, in response to intermittent pre-ignition in the cylinder, engine load may be limited by a first smaller amount, while at 718, in response to persistent pre-ignition in the cylinder, engine load may be limited by a second greater amount. For example, in response to intermittent pre-ignition, boost may be reduced by a (first) smaller amount, throttle opening may be reduced by a (first) smaller amount, or camshaft timing may be adjusted by a (first) smaller amount. In comparison, in response to persistent pre-ignition, boost may be reduced by a (second) larger amount, throttle opening may be reduced by a (second) larger amount, or camshaft timing may be adjusted by a (second) larger amount.

Similarly, the enrichment profiles may be adjusted differently. For example, at 726, the enrichment in response to intermittent pre-ignition may be made less rich and/or of a shorter duration, while at 720, the enrichment in response to persistent pre-ignition may be made more rich and/or for a longer duration. The degree of richness of the enrichment, and/or the duration of the enrichment, as well as the amount of load limiting may also be increased as the number of consecutive pre-ignition events in the cylinder increases (e.g., exceeds the threshold). That is, persistent pre-ignition may be addressed more aggressively than intermittent pre-ignition.

Further, based on the nature of the pre-ignition and the pre-ignition count, the enrichment and load limiting may be extended to other cylinders of the engine. In one example, the pre-igniting cylinder may be located on a first cylinder group (or bank) of the engine. Herein, in response to persistent pre-ignition in the cylinder, limiting engine load may include limiting an engine load of all cylinders on the first group more than the cylinders on the second group. In one example, this may be achieved by adjusting a camshaft timing of the first group more than the second group. In comparison, in response to intermittent pre-ignition in the cylinder, only the engine load of the first group and not the second group may be limited, for example, by maintaining the camshaft timing of the second group while adjusting the camshaft timing of the first group. In another example, in response to persistent pre-ignition, all engine cylinders may be limited by a larger amount, while only the cylinders of the first group may be limited by a smaller amount in response to intermittent pre-ignition.

Similarly, in response to persistent pre-ignition in a cylinder in the first group, the cylinders of the first group, but not the second group may be enriched, the cylinders of the first group may be enriched more (e.g., more rich and/or for a longer duration) than the cylinders of the second group, or all engine cylinders may be enriched equally rich (at the higher amount). In still another example, in response to persistent pre-ignition in a cylinder, all engine cylinders may be enriched, the pre-ignition cylinder enriched more (more rich and/or for a longer duration), and an enrichment of all the other cylinders adjusted based on their firing order (e.g., the enrichment of a cylinder firing immediately after the affected cylinder adjusted to be more rich than a cylinder firing later).

As previously elaborated, in addition to the enrichment and load limiting, cylinder spark timing may be advanced by an amount, relative to the spark timing at the time of pre-ignition detection, towards MBT. In addition to engine speed and enrichment, the amount of spark advance may also be adjusted based on the nature of the pre-ignition. For example, spark timing may be advanced by a larger amount in response to persistent pre-ignition, while spark timing may advanced by a smaller amount in response to intermittent pre-ignition.

In this way, persistent pre-ignition may be addressed more aggressively than intermittent pre-ignition. While the depicted example illustrates adjusting the enrichment and load-limiting differently based on the intermittent or persistent nature of pre-ignition, still other intermediate pre-ignition states may also be possible that are based on the rate of change in pre-ignition count. For example, a more aggressive approach may be used in response to a faster increase in pre-ignition count while a less aggressive approach may be used in response to a slower increase in pre-ignition count.

Still other adjustments to the enrichment and load limiting profile may be possible based on the pre-ignition count. As previously discussed with reference to FIG. 6, the enrichment of a cylinder may be increased as the pre-ignition count increases and exceeds a threshold. In one example, during a first condition, with a first, lower number of (previous) pre-ignition events, operation of a first cylinder may be adjusted (e.g., enriched) in response to an indication of pre-ignition in the first cylinder. In comparison, during a second condition, with a second, higher number of (previous) pre-ignition events, operation of a first and a second cylinder may be adjusted (e.g., enriched) in response to an indication of pre-ignition in the first cylinder. In some example, the enrichment of the first cylinder in the first condition may be less rich and/or for a shorter duration than the enrichment of the second cylinder in the second condition. Similarly, during the first condition, a load of the first cylinder may be limited by a first smaller amount while during the second condition, the load of the first and second cylinder may be limited by a second, higher amount.

The adjustment may also vary differently based on different pre-ignition counts. For example, an engine load limiting and enrichment in response to the cylinder trip pre-ignition count may be more than the load limiting in response to the cylinder lifetime pre-ignition count. That is, pre-ignition issues over an engine cycle may be addressed more aggressively than overall engine pre-ignition issues, to curb further pre-ignition events over the same engine cycle. In another example, engine load limiting and enrichment in response to the engine trip pre-ignition count may be more than the load limiting in response to the cylinder trip pre-ignition count.

In still another example, when the affected cylinder is in a first group of cylinders of the engine, all engine cylinders may be enriched when the consecutive pre-ignition count is greater than a first, higher threshold, while engine cylinders of the first group, but not the second group, may be enriched when the consecutive pre-ignition count is greater than a second, lower threshold. Similarly, an engine load of the all engine cylinders may be limited when the consecutive pre-ignition count is greater than the first, higher threshold, while the an engine load of the first group of cylinders may be limited more than the second group, when the consecutive pre-ignition count is greater than the second, lower threshold. Still other combinations may be possible.

In this way, the enrichment and load limiting in an engine in response to a cylinder pre-ignition event may be adjusted not only based on engine operating conditions, but also based on a cylinder's pre-ignition history, a pre-ignition count, and a nature of the pre-ignition. In this way, the propensity for further pre-ignition in the affected engine cylinder, as well as other engine cylinders, may better anticipated and pre-ignition may be better addressed.

Figure 8:
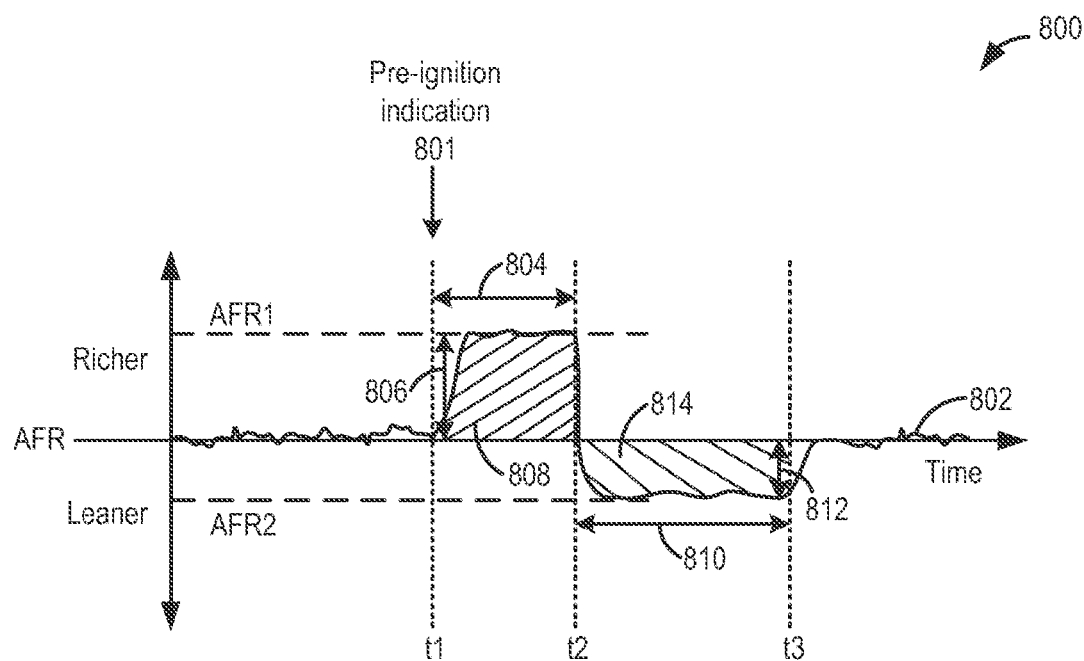
FIGS. 8-9 show example fuel injection operations, according to the present disclosure.
Figure 9:
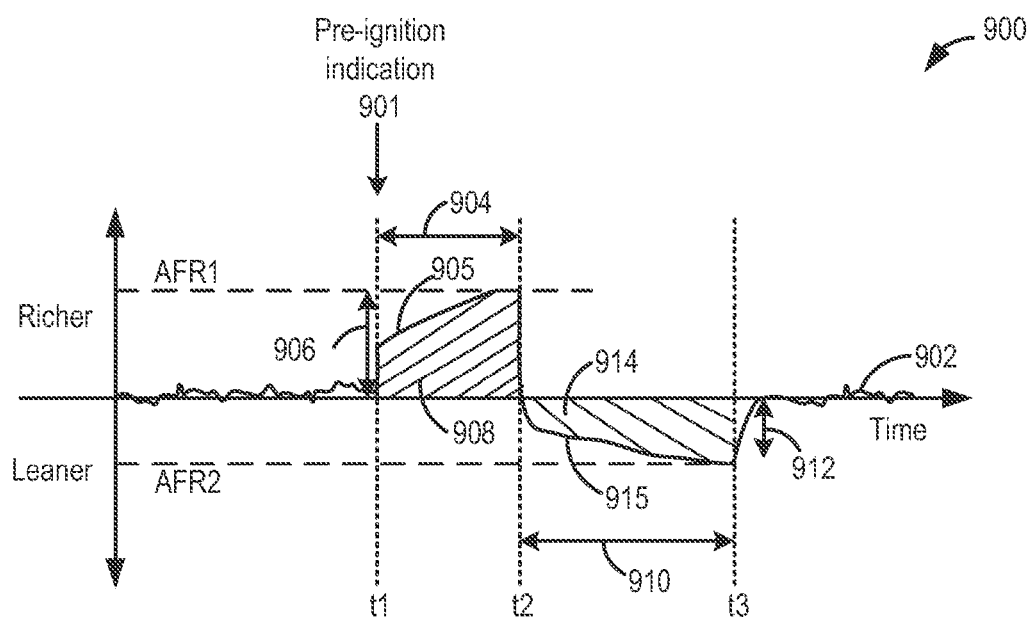

Example enrichment and enleanment profiles, as described previously, are now explained in the example fuel injection operations of FIGS. 8-9.

First turning to FIG. 8, map 800 depicts a first example pre-ignition mitigating operation according to the present disclosure. An air-to-fuel ratio (AFR) of the injected fuel mixture is shown along the y-axis while time is depicted over the x-axis. As shown, before t1, the fuel mixture injected inside a cylinder may be substantially at stoichiometry. At t1, in response to pre-ignition indication 801, the affected cylinder may be operated with a first air-to-fuel ratio AFR1 richer than stoichiometry for a first duration 804. The degree of richness 806 of the injection and the first duration 804 may be adjusted based on engine operating conditions at the time of the pre-ignition indication 801. After the first duration has elapsed, at t2, a controller may be configured to determine an amount of excess fuel injected over the first enrichment operation. As such, the amount of excess fuel may be computed as an area 808 under the curve of the first enrichment operation. That is, area 808 may represent an integral of excess fuel and unburned HCs from the enrichment.

At t2, the cylinder may be transitioned from the first air-to-fuel ratio AFR1 to a second air-to-fuel ratio AFR2 leaner than stoichiometry for a second duration 810. One or more of the degree of leanness 812 of the lean fuel injection and the second duration 810 may be adjusted based on one or more of the first duration 804 and the degree of richness 806. For example, the degree of leanness 812 and/or the second duration 810 of the second enleanment operation may be increased as the first duration 804 and the degree of richness 806 of the first enrichment operation increases. The degree of leanness 812 and the second duration 810 may be selected such that an amount of excess exhaust oxygen generated over the lean fuel injection operation may compensate for the excess fuel injected over the rich fuel injection operation. As such, the amount of excess oxygen may be computed as an area 814 under the curve of the second lean fuel injection. That is, area 814 may be an integral of the excess oxygen from the enleanment operation. Thus, the second duration 810 may be adjusted based on the exhaust gas content such that the cylinder is continued to be operated at the second air-to-fuel ratio AFR2 until the exhaust gas oxygen content is returned above a threshold.

At t3, after the second duration 810 has elapsed, and the exhaust gas oxygen content has been restored above the threshold value, the cylinder may be transitioned back from the second air-to-fuel ratio AFR2 to an air-to-fuel ratio substantially at stoichiometry.

Now turning to FIG. 9, map 900 depicts a second example pre-ignition mitigating operation according to the present disclosure. Herein, before t1, the fuel mixture injected inside the cylinder may be substantially at stoichiometry. At t1, in response to pre-ignition indication 901, the affected cylinder may be enriched for a first duration 904 at a first rate of enrichment 905 over the first duration. Specifically, the cylinder may be operated at an air to injected fuel ratio richer than stoichiometry, and the degree of richness 906 of the air to injected fuel ratio may be varied over the first duration 904 such that air-to-fuel ratio AFR1 richer than stoichiometry is attained before the end of first duration 904. In one example, as depicted, the rate of enrichment 905 may be adjusted such that a degree of richness may increase as a number of combustion events since pre-ignition increases. In an alternate example, the rate of enrichment 905 may be adjusted such that a degree of richness may decrease as a number of combustion events since pre-ignition increases. After the first duration has elapsed, at t2, the cylinder may be configured to determine an amount of excess fuel injected over the first enrichment operation. As such, the amount of excess fuel generated over the enrichment may be computed as an area 908 under the curve of the enrichment operation. That is, area 908 may represent an integral of excess fuel and unburned HCs from the enrichment.

At t2, the cylinder may be transitioned from an air-to-fuel ratio richer than stoichiometry to an air-to-fuel ratio leaner than stoichiometry for a second duration 910. The second duration 910 of enleanment may be based on the first duration 904 of the preceding enrichment. Specifically, the affected cylinder may be enleaned at a second rate of enleanment 915 over the second duration 910. Herein, the cylinder may be operated at an air to injected fuel ratio leaner than stoichiometry, and the degree of richness 912 of the air to injected fuel ratio may be varied over the second duration 910 such that air-to-fuel ratio AFR2 leaner than stoichiometry is attained before the end of second duration 910. One or more of the degree of leanness 912, rate of enleanment 915, and second duration 910 may be adjusted based on one or more of the first degree of richness 906, rate of enrichment 905, and first duration 904 of the preceding enrichment. For example, the degree of leanness 912 and/or the second duration 910 of the enleanment operation may be increased as the first duration 904 and the degree of richness 906 of the preceding enrichment increases. In one example, as depicted, the rate of enleanment 915 may be adjusted such that a degree of leanness may increase as a number of combustion events since pre-ignition increases. In an alternate example, the rate of enleanment 915 may be adjusted such that a degree of leanness may decrease as a number of combustion events since pre-ignition increases. The degree of leanness 912 and the second duration 910 may be selected such that an amount of excess exhaust oxygen generated over the enleanment may compensate for the excess fuel injected over the preceding enrichment. As such, the amount of excess oxygen may be computed as an area 914 under the curve of the enleanment. That is, area 914 may be an integral of the excess oxygen from the enleanment operation. Thus, the second duration 910 may be extended based on the exhaust gas content such that the cylinder is continued to be enleaned until the exhaust gas oxygen content is returned above a threshold.

At t3, after the second duration 910 has elapsed, and the exhaust gas oxygen content has been restored above the threshold value, the cylinder may be transitioned back to an air-to-fuel ratio substantially at stoichiometry.

While the depicted example indicates modifying the amount of fuel injected in the affected cylinder, it will be appreciated that in alternate examples, the amount of fuel injected into all the cylinders of the engine may be adjusted in response to an indication of pre-ignition in one of the cylinders. As previously elaborated, the enrichment of each cylinder may be adjusted on an individual cylinder, or group of cylinders, basis.

In this way, a rich fuel injection operation may be used to rapidly address pre-ignition while a subsequent lean fuel injection operation is used to address potential catalyst efficiency degradation arising from the rich fuel injection operation. Specifically, by balancing the excess fuel from the rich fuel injection operation with the excess oxygen from the lean fuel injection operation, exhaust feed-gas oxygen levels may be returned to within a desired range, thereby also restoring the catalytic efficiency of emission catalysts. By limiting an engine load while enriching the cylinder, additional cylinder cooling benefits to pre-ignition mitigation may be attained. Further, by adjusting the enrichment and the engine load limiting based on a likelihood of pre-ignition, pre-ignition feedback, and pre-ignition history, pre-ignition may be better anticipated and addressed, thereby reducing engine degradation.

Note that the example control and estimation routines included herein can be used with various system configurations. The specific routines described herein may represent one or more of any number of processing strategies such as event-driven, interrupt-driven, multi-tasking, multi-threading, and the like. As such, various actions, operations, or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, functions, or operations may be repeatedly performed depending on the particular strategy being used. Further, the described operations, functions, and/or acts may graphically represent code to be programmed into computer readable storage medium in the control system It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and nonobvious combinations and subcombinations of the various systems and configurations, and other features, functions, and/or properties disclosed herein.

The following claims particularly point out certain combinations and subcombinations regarded as novel and nonobvious. These claims may refer to "an" element or "a first" element or the equivalent thereof. Such claims should be understood to include incorporation of one or more such elements, neither requiring nor excluding two or more such elements. Other combinations and subcombinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method for an engine, comprising,
enriching an engine cylinder and limiting engine load in response to a trip pre-ignition count over a drive cycle and a lifetime pre-ignition count.

2. The method of claim 1 wherein the trip pre-ignition count includes a number of pre-ignition events in the cylinder over the drive cycle.

3. The method of claim 1 wherein the trip pre-ignition count includes a number of pre-ignition events in the engine over the drive cycle.

4. The method of claim 1 wherein the lifetime pre-ignition count includes a number of pre-ignition events in the cylinder over a life of the engine.

5. The method of claim 1 wherein the trip pre-ignition count includes a number of pre-ignition events in the engine over a life of the engine.

6. The method of claim 1 wherein limiting the engine load includes a limiting the load to a first level responsive to the trip pre-ignition count, and limiting the load to a second level responsive to the lifetime pre-ignition count.

7. The method of claim 1, the limiting of the engine load based on whether the pre-ignition is persistent or intermittent, persistent pre-ignition based on a higher number of consecutive pre-ignition events of a plurality of consecutive cylinder combustion event than the intermittent pre-ignition, the intermittent pre-ignition including a plurality of discrete pre-ignition events over a plurality of consecutive cylinder combustion events; and the persistent pre-ignition including a plurality of continuous pre-ignition events over the plurality of consecutive cylinder combustion events.

8. The method of claim 1 wherein the lifetime pre-ignition count is based on total mileage of the vehicle over the lifetime of the vehicle.

9. The method of claim 1 wherein the trip pre-ignition count is based on total mileage of the vehicle over the drive cycle.

10. The method of claim 1, wherein limiting engine load includes reducing boost.

11. The method of claim 1, wherein limiting engine load includes reducing throttle opening.

12. The method of claim 1, wherein limiting engine load includes adjusting camshaft timing.

13. The method of claim 1, wherein a degree of richness of the enrichment is adjusted responsive to a number of consecutive pre-ignition events in the cylinder, the adjustment including, increasing the degree of richness as the number of consecutive pre-ignition events in the cylinder exceeds a threshold.

14. The method of claim 7, further comprising, in response to intermittent or persistent pre-ignition, after enriching the cylinder, enleaning the cylinder, the enleanment based on the preceding enrichment.

15. A method for an engine, comprising,
boosting engine intake air;
direct injecting fuel into a cylinder;
spark-igniting combustion; and
enriching the fuel injection and limiting engine load of the cylinder in response to a trip pre-ignition count over a drive cycle and a lifetime pre-ignition count.

16. A method for an engine, comprising,
boosting engine intake air;
direct injecting fuel into a cylinder;
spark-igniting combustion; and
enriching the fuel injection and limiting engine load of the cylinder in response to a trip pre-ignition count over a drive cycle and a lifetime pre-ignition count, and in response to a persistence of the pre-ignition.

* * * * *